United States Patent
Kobayashi et al.

(10) Patent No.: US 7,407,894 B2
(45) Date of Patent: Aug. 5, 2008

(54) COMPOUND SEMICONDUCTOR PARTICLES AND PRODUCTION PROCESS THEREFOR

(75) Inventors: Masakazu Kobayashi, 2-4-15, Toyotamanaka, Nerima-ku, Tokyo (JP) 176-0013; Mitsuo Takeda, Sanda (JP)

(73) Assignees: Masakazu Kobayashi, Nerima-ku, Tokyo (JP); Nippon Shokenbai Co., Ltd., Osaka (JP)

( * ) Notice: Subject to any disclaimer, the term of this patent is extended or adjusted under 35 U.S.C. 154(b) by 374 days.

(21) Appl. No.: 10/525,848

(22) PCT Filed: Aug. 27, 2003

(86) PCT No.: PCT/JP03/10818

§ 371 (c)(1), (2), (4) Date: Sep. 9, 2005

(87) PCT Pub. No.: WO2004/022483

PCT Pub. Date: Mar. 18, 2004

(65) Prior Publication Data

US 2006/0110896 A1      May 25, 2006

(30) Foreign Application Priority Data

Sep. 6, 2002  (JP) .............................. 2002-262061
Mar. 26, 2003  (JP) .............................. 2003-086310

(51) Int. Cl.
H01L 21/469 (2006.01)
(52) U.S. Cl. ................................ 438/781; 257/E21.502
(58) Field of Classification Search ................. 438/767, 438/779, 781; 257/E21.502
See application file for complete search history.

(56) References Cited

U.S. PATENT DOCUMENTS

| 2,885,366 A | 5/1959 | Iler |
| 2,971,859 A | 2/1961 | Sisneros et al. |
| 5,006,277 A | 4/1991 | Yoneshima et al. |

(Continued)

FOREIGN PATENT DOCUMENTS

JP     1-104684 A     4/1989

(Continued)

OTHER PUBLICATIONS

Adair et al., Materials Science and Engineering R: vol. 23 (4-5), p. 139(1998).*

(Continued)

*Primary Examiner*—Asok K Sarkar

(57) ABSTRACT

There are provided: compound semiconductor particles that can display more excellent performance in functions peculiar to the compound semiconductor (e.g. luminosity and luminescence efficiency); and a production process for obtaining such compound semiconductor particles with economy, good productivity, and ease.

Compound semiconductor particles, according to the present invention, are characterized by comprising body particles and a metal oxide, wherein the body particles have particle diameters of smaller than 1 μm and are covered with the metal oxide and include a compound semiconductor including an essential element combination of at least one element X selected from the group consisting of C, Si, Ge, Sn, Pb, N, P, As, Sb, S, Se, and Te and at least one metal element M that is not identical with the element X, and wherein the metal oxide is a metal oxide to which an acyloxyl group is bonded.

5 Claims, 2 Drawing Sheets

100nm     Magnifying power: 100,000

U.S. PATENT DOCUMENTS

| | | | |
|---|---|---|---|
| 5,032,316 | A | 7/1991 | Takahashi et al. |
| 5,368,886 | A | 11/1994 | Tono et al. |
| 5,985,173 | A | 11/1999 | Gray et al. |
| 6,153,123 | A | 11/2000 | Hampden-Smith et al. |
| 6,656,602 | B1 * | 12/2003 | Ishikawa et al. ............ 428/522 |

FOREIGN PATENT DOCUMENTS

| | | | |
|---|---|---|---|
| JP | 2-41389 | A | 2/1990 |
| JP | 3-229635 | A | 10/1991 |
| JP | 4-314781 | A | 11/1992 |
| JP | 05124818 | * | 5/1993 |
| JP | 2514423 | B2 | 4/1996 |
| JP | 2946763 | B2 | 7/1999 |
| JP | 2000-265166 | A | 9/2000 |
| JP | 2000290589 | * | 10/2000 |
| JP | 2003-64278 | A | 3/2003 |

OTHER PUBLICATIONS

Dabbousi et al., (CdSe)ZnS Core-Shell Quantum Dots: Synthesis and Characterization of a Size Series of Highly Luminescent Nanocrystallites, J. Phys. Chem. B, 1997, pp. 9463-9475, vol. 101, No. 46, American Chemical Society, Washington, D.C.

Correa-Duarte et al., Stabilization of CdS semiconductor nanoparticles against photodegradation by a silica coating procedure, Chemical Physics Letters, Apr. 17, 1998, pp. 497-501, vol. 286, Elsevier Science B.V., Amsterdam.

Adair, J.H. et al., Recent developments in the preparation and properties of nanometer-size spherical and platelet-shaped particles and composite particles, Materials Science and Engineering, R23 (1998). pp. 139-242, Elsevier Science S.A., Amsterdam, The Netherlands.

* cited by examiner

100nm    Magnifying power: 100,000

100nm    Magnifying power: 100,000

(a)                      (b)

Zn                     Zn + Cd

US 7,407,894 B2

COMPOUND SEMICONDUCTOR PARTICLES AND PRODUCTION PROCESS THEREFOR

This is the U.S. national phase of International Application No. PCT/JP2003/010818, filed Aug. 27, 2003, which claims priority from Japanese Patent Application No. 2003-086310 filed Mar. 26, 2003 and Japanese Patent Application No. 2002-262061 filed Sept. 6, 2002.

TECHNICAL FIELD

The present invention relates to compound semiconductor particles and a production process therefor.

BACKGROUND ART

It has hitherto been known that: particles including a so-called compound semiconductor such as ZnS and CdSe (also including compound semiconductors doped with such as Ag and Mn) (compound semiconductor particles) have various useful functions such as of being able to emit fluorescence by irradiating the particles with ultraviolet rays and/or electron beams as excitation sources or applying a voltage to the particles (e.g. U.S. Pat. No. 5,455,489). In addition, in recent years, as to compound semiconductor particles including such as CdSe and Mn-doped ZnS, it is being verified on a research level and thus becoming clear that, if the particles are more fined to thereby be quantum-sized, then the particles become excellent in various functions, for example, there can be obtained particles having a high luminance of the fluorescence.

However, the compound semiconductor particles generally have a problem such that, if the compound semiconductor particles are quantum-sized, then they become unable to sufficiently perform their peculiar functions, for the reason such that: the particles are lacking in heat resistance, and their surfaces become more easily oxidized. Thus, it is thought that: the particles are lacking in stability and durability and are very difficult to put to practical use. In addition, in the case where the particles are fined to thereby be quantum-sized, it becomes more and more difficult to maintain a favorable monodispersed state. However, unless the compound semiconductor particles are in such a favorable monodispersed state, for example, there is a problem that: their luminosity greatly decreases, and further there is a problem that the properties such as luminescence greatly vary also with the kinds of dispersants as used for dispersing the particles.

On the other hand, as is mentioned above, the dispersed state of the compound semiconductor particles has a great influence on such as their luminosity and/or luminescence efficiency. Thus, in order to treat the compound semiconductor particles in a state where their primary particles are isolated from each other (in the monodispersed state), there have hitherto been made the following proposals.

First, there has been proposed a method that involves treating the surfaces of CdSe particles with ZnS (for example, M. G. Bawendi et al., "J. Phys. Chem. B", volume 101, pages 9463 to 9475 (published in 1997)). However, as to this method, the compound semiconductor particles which are inherently lacking in chemical durability (e.g. oxidation resistance) and thermal durability are merely treated with the similar compound semiconductor. Therefore, even if the properties are temporarily enhanced, there is a problem of lacking the practicability after all.

In addition, there has been proposed a method that involves attaching oxide particles (e.g. zinc oxide, indium oxide and silica) to surfaces of micron-sized sulfide-type fluophor particles (for example, JP-A-104684/1989 and JP-A-041389/1990). However, as to this method, the attachment of the oxide particles to the compound semiconductor particles needs a heat-treatment step at a high temperature after the attachment-treatment step. Therefore, there are problems such that: the movement of substances and the defectiveness occur during this heating at the high temperature to greatly deteriorate the luminescence property; and there are economical disadvantages of increasing such as treatment costs, and it is necessary to involve a complicated treatment step, so the productivity is inferior.

Furthermore, in recent years, there have been proposed some methods that involve covering a nano-sized level of fluophor particles with such as sulfides, oxides, and other inorganic substances (for example, U.S. Pat. No. 5,985,173, JP-A-265166/2000, Japanese Patent No. 2514423, and Japanese Patent No. 2946763). However, these methods, for example, have the following prior problems: the chemical and thermal stabilities are insufficient; the monodispersibility is so inferior that the excellent fluorescence property as expected by the nano-sizing cannot sufficiently be displayed; and also, the economy is poor, and the productivity is inferior.

DISCLOSURE OF THE INVENTION

Object of the Invention

Accordingly, an object of the present invention is to provide: compound semiconductor particles that can display more excellent performance in functions peculiar to the compound semiconductor (e.g. luminosity and luminescence efficiency); and a production process for obtaining such compound semiconductor particles with economy, good productivity, and ease.

SUMMARY OF THE INVENTION

The present inventors diligently studied to solve the above-mentioned problems.

As a result, they have found that: if nano-sized superfine compound semiconductor particles are compound semiconductor particles covered with a metal oxide to which an acyloxyl group is bonded, then they are particles having excellent chemical and thermal durability and also good monodispersibility, and therefore the properties as enhanced by the above nano-sizing can be displayed sufficiently, and besides, there is surprisingly also a case where the above enhanced properties can be further extensively displayed.

Furthermore, the present inventors have found out that: if, when the particles including a compound semiconductor are covered, there is heated or polish-pulverized a mixture obtained by further adding the particles including the compound semiconductor to a mixture including a metal carboxylate and an alcohol or to a mixture including a metal-alkoxy-group-containing compound and a carboxyl-group-containing compound, then a reaction to form the metal oxide from the metal carboxylate and the alcohol or from the metal-alkoxy-group-containing compound and the carboxyl-group-containing compound in the presence of the particles including the compound semiconductor is caused by heat due to the aforementioned heating or by heat as generated by the frictional force during the aforementioned polish-pulverization, so that the compound semiconductor particles as covered (specifically, with the metal oxide) are obtained economically and easily.

In addition, the present inventors have found that: if the above compound semiconductor particles as covered with the metal oxide are obtained by a production process including specific steps, then surprisingly the peculiar functions and properties (e.g. luminescence property) are further greatly enhanced.

The present inventors have completed the present invention by confirming that the compound semiconductor particles and production process therefor, as based on the above findings, could solve the above problems at a stroke.

That is to say, compound semiconductor particles, according to the present invention, are characterized by comprising body particles and a metal oxide, wherein the body particles have particle diameters of smaller than 1 µm and are covered with the metal oxide and include a compound semiconductor including an essential element combination of at least one element X selected from the group consisting of C, Si, Ge, Sn, Pb, N, P, As, Sb, S, Se, and Te and at least one metal element M that is not identical with the element X, and wherein the metal oxide is a metal oxide to which an acyloxyl group is bonded.

A first production process for compound semiconductor particles, according to the present invention, is characterized by comprising the step of heating and/or polish-pulverizing a mixture including a metal carboxylate, an alcohol, and particles or a mixture including a metal-alkoxy-group-containing compound, a carboxyl-group-containing compound, and particles, thereby covering the particles with a metal oxide, wherein the particles include a compound semiconductor.

A second production process for compound semiconductor particles, according to the present invention, is characterized by comprising the steps of: polish-pulverizing coarse particles of a compound semiconductor to thereby obtain particles having particle diameters of smaller than 1 µm; and then covering the resultant particles with a metal oxide.

EFFECTS OF THE INVENTION

The present invention can provide compound semiconductor particles that can display more excellent performance in functions peculiar to the compound semiconductor (e.g. luminosity and luminescence efficiency). Also, the present invention can provide a production process for obtaining such compound semiconductor particles with economy, good productivity, and extreme ease.

DETAILED DESCRIPTION OF THE INVENTION

Figure 1:
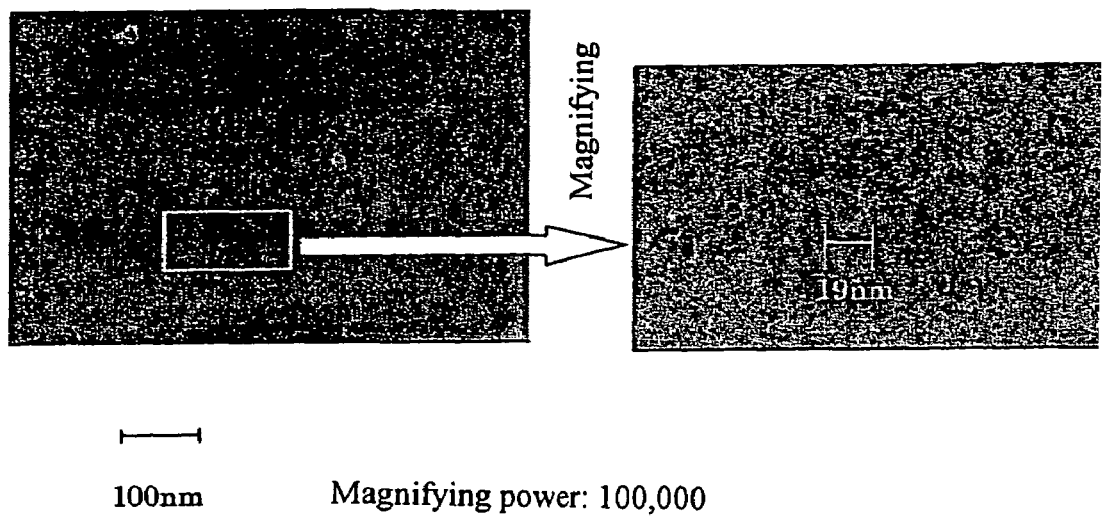
FIG. 1 is an electron micrograph showing a TEM image of the fine CdSe particles having particle diameters of about 19 nm as obtained in Example 1.

Hereinafter, detailed descriptions are given about the compound semiconductor particles and the production process therefor according to the present invention. However, the scope of the present invention is not bound to these descriptions. And other than the following illustrations can also be carried out appropriately within the scope not departing from the spirit of the present invention.

[Compound Semiconductor Particles]:

The compound semiconductor particles according to the present invention are particles of which the body particles including the compound semiconductor are covered. By being covered with the metal oxide, the body particles including the compound semiconductor become particles of which such as the chemical durability (e.g. oxidation resistance) and thermal durability have easily been enhanced, and besides, of which the monodispersibility is excellent. As a result, the particles become able to sufficiently and stably display their functions and properties peculiar to compound semiconductor particles. Furthermore, if various conditions such as the kind of the covering substance and the covering amount (e.g. area and thickness) are controlled, then it is also possible to control the enhancement of the functions and properties of the compound semiconductor particles and to control their monodispersibility.

Although there is no especial limitation on the peculiar functions and properties possessed by the compound semiconductor particles, yet examples thereof include: semiconductor functions, such as luminescence property (fluorescence emission), electronic conductivity, and photoconductivity; (photo)magnetic functions, such as ferromagnetism and magnetic optical properties; and magnetic semiconductor functions. Of the above, the luminescence property can effectively be enhanced by the above covering.

The compound semiconductor, constituting the compound semiconductor particles according to the present invention or the above body particles, refers to a compound semiconductor including an essential element (element constituting the compound) combination of at least one element X selected from the group consisting of C, Si, Ge, Sn, Pb, N, P, As, Sb, S, Se, and Te and at least one metal element M that is not identical with the element X (such a compound semiconductor may hereinafter be referred to as compound semiconductor A). As the metal element M, there can be used at least one member selected from among: group 1A, group 2A, group 3A, group 4A, group 5A, group 6A, group 7A, group 8, group 1B, group 2B, group 3B, group 4B (excluding C), group 5B (excluding N), group 6B (excluding O and S), lanthanoide elements, and actinoide elements in the periodic table. Incidentally, herein, "*Periodic table of elements (published in 1993)*" shown in the 5th edition of "*Chemical Handbook (edited by the Chemical Society of Japan)*" (published by Maruzen Co., Ltd.) is used as the periodic table, and the group numbers are shown by a system of subgroup notation.

The compound semiconductor, constituting the compound semiconductor particles according to the present invention or the above body particles, will do if it is a compound including the above element X and metal element M. Examples thereof include: compounds of which a part of metal elements M are displaced with H (hydrogen atoms) (also including compounds in which the H are used as the second, third, fourth, . . . metal elements M in the case of the below-mentioned mixed crystal); and besides, compounds of which a part of elements X are displaced with O (oxygen atoms). Thus, there is no especial limitation. In addition, there is no especial limitation on the doping element for the below-mentioned solid solution. Any element can be selected and then used.

Incidentally, in the present invention, the aforementioned compound semiconductor A is not necessarily limited only to the compound having the above-mentioned functions and properties peculiar to semiconductors. The compound semiconductor A may include a compound having very low semiconductor properties and/or a compound having no semiconductor properties if it includes the combination of the above elements X and M.

As to the compound semiconductor A, for example, so-called III-V compounds, II-VI compounds, IV-IV compounds, IV-VI compounds, and M-X compounds containing group 2A elements as M are favorable as M-X compounds. Direct transition type III-V compounds and II-VI compounds are favorable as compound semiconductors having the luminescence property.

The III-V compounds are compounds including a combination of a group 3B element as the M and a group 5B element as the X in the periodic table. Specific examples thereof include GaAs, GaAsP, GaAlAs, AlP, InP, GaP, InGaAlP, AlS, GaN, InGaN, BN, InSb, GaSb, and nitrides of BAlGaIn. Of the above, such as GaN, InGaN, GaAs, and GaAsP are cited as compounds having an excellent luminescence property.

The II-VI compounds are compounds including a combination of a group 2B element as the M and a group 6B element (excluding the oxygen) as the X in the periodic table. Specific examples thereof include ZnS, ZnSe, ZnTe, CdS, CdSe, CdTe, HgS, HgSe, and HgTe. Of the above, such as CdS, CdSe, ZnSe, ZnS, and ZnMgSe are cited as compounds having an excellent luminescence property.

The IV-IV compounds are compounds including a combination of group 4B elements as the M and X in the periodic table. Specific examples thereof include SiC and SiGe. Of the above, such as SiC is cited as a compound having an excellent luminescence property.

The IV-VI compounds are compounds including a combination of a group 4B element as the M and a group 6B element (excluding the oxygen) as the X in the periodic table. Specific examples thereof include SnTe, PbS, PbSe, and PbTe. Of the above, such as PbTe is cited as a compound having an excellent luminescence property.

Examples of the M-X compounds, containing group 2A elements as M, include MgS, CaS, SrS, BaS, CaSrS, SrSe, BaSe, and CaTe.

In the present invention, the compound semiconductor A may be in the form of a mixed crystal. Examples of the mixed crystal of the compound semiconductor generally include three-element-mixed crystals, four-element-mixed crystals, five-element-mixed crystals, and six-element-mixed crystals. As to the above two-element compounds such as the III-V compounds, their various chemical and physical properties are unambiguously determinate, so there is no room to artificially control them. However, if the compound semiconductor is in the form of the mixed crystal, the properties can be controlled by the mixing ratio between the elements. For example, it is also possible to set the lattice constant and the band structure independently of each other.

In the present invention, the compound semiconductor A is referred to as the M-X compound as mentioned above. This M-X compound is not limited to a compound having a definite-ratio composition (for example, in the case of CdSe, Cd:Se=1:1). The M-X compound may be a compound having an indefinite-ratio composition (e.g. $Cd_{0.98}Se_{1.0}$ compound) or a mixture of the compound having the definite-ratio composition and the compound having the indefinite-ratio composition. Thus, there is no especial limitation. In addition, herein, in the case where the M-X compound is a compound having a mixed crystal form, then, for example, the forms as generally shown by $Cd_{1-x}Zn_xSe_{1-y}S_y$ and $Cd_{1-x}Zn_xSe_1$ are referred to simply as CdZnSeS and CdZnSe respectively. Accordingly, for example, InGaN refers to not the form of In:Ga:N=1:1:1 in elemental ratio, but $In_{0.1}Ga_{0.9}N_{1.0}$, which is a compound form having a definite-ratio composition, and/or a compound form of it having an indefinite-ratio composition.

In the present invention, the compound semiconductor A may be in the form of a solid solution as doped with a different kind of metal element or non-metal element (e.g. ZnS doped with Mn). Preferred examples of the different kind of metal element or non-metal element as used for the doping include: typical metal ions as luminescent-center metals, such as $Sb^{3+}$, $Sn^{2+}$, $Pb^{2+}$, and $Tl^+$; transition metal ions such as $Mn^{2+}$, $Cr^{3+}$, $Ag^+$, and $Cu^{2+}$; rare earth metal ions such as $Ce^{3+}$, $Ce^{4+}$, $Eu^{2+}$, $Eu^{3+}$, $Tb^{3+}$, $Er^{3+}$, $Sm^{3+}$, $Nd^{3+}$, $Ho^{3+}$, and $Yb^{3+}$; and halogen atoms such as F and Cl. They can give effects such as of displaying such a sharp luminescence property as to be narrow in luminescence wavelength width.

As to the body particles including the compound semiconductor and constituting the compound semiconductor particles according to the present invention, their particle diameters are favorably in the nano-sized range of smaller than 1 μm, more favorably smaller than 0.1 μm, still more favorably smaller than 0.01 μm. If the particle diameters are in the nano-sized range, then the peculiar functions and properties inherently possessed by the compound semiconductor particles are displayed with higher efficiency due to the quantum effects. For example, also as to particles having the luminescence property, it can be considered that: (1) higher luminescence efficiency can be displayed; (2) the narrowing of the luminescence wavelength width can display the luminescence property of a higher luminance, and further (3) the luminescence wavelength can be controlled by regulating the particle diameters because the luminescence is made by the quantum effects. Such enhancement of the functions and properties is more sufficiently displayed by the covering (as referred to in the present invention) of the particles. The effects as obtained by the covering (as referred to in the present invention) of the particles are particularly remarkable in the case where the objects of the covering are the above compound semiconductor particles having the nano-sized range of particle diameters.

The compound semiconductor particles according to the present invention are particles covered with the metal oxide. There is no especial limitation on the metal oxide provided to the covering. Preferred examples thereof include metal oxides having properties as n-type semiconductors, p-type semiconductors, insulators, and dielectrics, and it is possible to adopt oxides of the elements that are previously cited as examples of the aforementioned metal element M. The metal oxide provided to the covering may be a single metal oxide, or a composite oxide, or a solid solution oxide. In the case where compound semiconductor particles having the luminescence property are used as the body particles and as luminophors, usually, it is favorable to cover the body particles with a metal oxide having a band gap on the shorter-wavelength side of the light-absorption wavelength and/or luminescence wavelength of the body particles. Examples of such a metal oxide include ZnO, $SnO_2$, and $In_2O_3$, and $SiO_2$.

In addition, the crystallinity of the metal oxide provided to the covering may be either crystalline or noncrystalline in electron diffraction and/or X-ray diffraction.

The form of the metal oxide provided to the covering may be either a particulate form or another form. Thus, there is no especial limitation.

Preferred examples of the metal oxide provided to the covering include the same as the metal oxide as formed in the below-mentioned first production process according to the present invention.

In the present invention, there is no especial limitation on the combination of the compound semiconductor (constituting the body particles) and the metal oxide (provided to the covering) (this combination is hereinafter referred to as "compound semiconductor/metal oxide"). However, specifically preferred examples thereof include "CdSe/ZnO", "CdS/ZnO", "ZnSe/ZnO", "ZnS/ZnO", "CdSSe/ZnO", "InGaN/ZnO", "ZnCdS/ZnO", "PbTe/ZnO", "CdSe/In$_2$O$_3$", "CdSe/SiO$_2$", and "CdSe/SnO$_2$". Incidentally, the metal oxides provided to the covering are simply shown by such as ZnO, In$_2$O$_3$, SnO$_2$, and SiO$_2$ in the above way. However, these may, for example, have either an oxygen-defective composition (e.g. ZnO$_{0.98}$) (oxides possible to form n-type semiconductors are usually apt to be in a metal-excess state) or a metal-deficient composition (oxides possible to form p-type semiconductors are usually apt to be in a metal-deficient state), or their mixture.

The covering with the metal oxide further has the following advantages. That is to say, the metal oxide surface easily adsorbs or reacts with such as various organic functional groups, metal hydride groups, and metal alkoxy groups. In addition, it is easy to introduce such as various organic compounds, coupling agents (e.g. silane coupling agents), and the below-mentioned surface-treating substance (A) into the metal oxide surface. Accordingly, as to the compound semiconductor particles according to the present invention as covered with the metal oxide, there can easily be carried out such as the control of the dispersibility into various mediums by secondary surface-treatment with hitherto publicly known dispersants that are conventionally and generally used favorably for metal oxide particles. Examples of the above organic functional group include a carboxyl group, an alkoxy group, a phenoxy group, an amino group, a quaternary ammonium group, an amide group, an imide group, a urethane group, a ureido group, an isocyanate group, an epoxy group, and a sulfonic acid group.

In addition, as to the compound semiconductor particles according to the present invention, the metal compound provided to the covering is a metal oxide to which the acyloxyl group is bonded. Examples of the acyloxyl group include an acetoxy group (ethanoyloxy group), a propionyloxy group, and an 2-ethylhexanoyloxy group. However, above all, the acetoxy group (ethanoyloxy group) is particularly favorable. If the metal oxide to which the acyloxyl group is bonded is provided to the covering, then there can further be enhanced various effects due to the covering with the metal oxide, particularly, the dispersibility into various mediums. The bonding amount of the acyloxyl group in the metal oxide is favorably in the range of 0.01 to 40 mol %, particularly favorably 0.1 to 20 mol %, relative to the metal in the metal oxide.

The form of covering the particles in the compound semiconductor particles according to the present invention may be a form of completely covering the body particle (covering the entirety of the body particle) or a form of partially covering the body particle (covering a portion of the body particle). Although not especially limited, the form of covering the entirety of the body particle is favorable in consideration of the quantum effects (e.g. enhancement of the luminescence property) in the case where the body particle is a particle being in the nano-sized range.

In addition, there is no especial limitation on the thickness of the covering. The covering may be either in the form of a single-molecular layer of the metal oxide provided to the covering or in the form of a multiple layer of a crystal lattice of this metal oxide. In addition, the covering layer may be either noncrystalline or crystalline. The form having thickness to a certain extent (e.g. the multiple layer of the crystal lattice) is preferable to the form of the single-molecular layer in consideration of the quantum effects (e.g. enhancement of the luminescence property).

In the present invention, it is favorable that the covering is made uniformly throughout the surface of the body particle including the compound semiconductor. Specifically, it is favorable that the covering is made throughout the entire surface of the body particle. Or, in the case where the covering is not made throughout the entire surface of the body particle, it is favorable that the covered portions exist in the evenly dispersed form. Besides, it is favorable that the thickness of the covering is almost the same at any covered portion.

The compound semiconductor particle according to the present invention may include at least two body particles, but, particularly favorably, includes one body particle.

Examples of uses of the compound semiconductor particles according to the present invention include luminophors having a high-efficient luminescence property. Specifically, the above particles can be used as fluophor particles of various colors (e.g. red (R), green (G), blue (B), and yellow (Y)) and as luminophor particles being in the ultraviolet or infrared wavelength range.

Examples of the fluophor particles of various colors include fluophor particles that can display a high luminance due to excitation made in various manners (e.g. excitation by irradiation of electron beams and/or ultraviolet rays, electric field excitation). Specific examples thereof include fluophor particles of various colors (e.g. red (R), green (G), blue (B), and yellow (Y)), wherein the fluophor particles can be used for a white LED possible to use as display devices (e.g. fluorescent lamps, color televisions, fluorescent display tubes, dispersed-type EL elements, thin-film-type EL elements, plasma displays, and FED (field emission displays)) and illumination light sources. In addition, as to medical uses, the above fluophor particles can be used also for tumor markers, curing medicines, and examining agents for the purpose of detection of tumors (e.g. cancers) or examination of such as their progress conditions.

In addition, examples of other uses of the compound semiconductor particles according to the present invention include various sensors (e.g. biosensors; sensors for search of land mines, TNT (trinitrotoluene), and earth vein; and ultraviolet sensors) and wavelength-converting films.

In the case where the compound semiconductor particles according to the present invention are, for example, used as the fluophor particles of various colors for the display devices, the particles need to uniformly be mixed and dispersed into such as coating liquids, and it is therefore favorable to use the particles together with a dispersant. The compound semiconductor particles are surface-treated (secondarily treated) with the dispersant so that the favorable dispersibility can be displayed. Examples of usable dispersants include: various coupling agents (e.g. silane coupling agents, titanate type coupling agents, and aluminate type coupling agents); polymer dispersants; cationic, anionic, amphoteric, and nonionic surfactants; and besides, fatty acids, organic amines, and alcohols.

In addition, as is mentioned above, the compound semiconductor particles according to the present invention can be used also as the medical markers. However, in that case, the particles are used after having been surface-treated (secondarily treated) with a substance (surface-treating substance (A)) as predetermined for each target (such as substance, tissue, and cell). Specific examples of the combination of the surface-treating substance (A) and the target ("surface-treating substance (A)/target") include "biotin/actinfilament", "urea or a compound containing a ureido group and carboxylic group/cell nucleus", "carboxylic acid/protein, peptide, and cell nucleus", "transferring/Hela cell", "thiol-modified DNA/DNA oligomer", "amino-group-modified DNA/DNA oligomer", "negative-charged lipoic acid/*E. coli*. Maltose binding protein-basic, zipper fusion protein, and prostaglandin", "negative-charged leucine zipper/positive-charged leucine zipper attached to C terminal of recombinant protein, and avidin".

The body particles in the compound semiconductor particles according to the present invention, favorably, have particle diameters of smaller than 1 µm and are obtained by a process including the step of polish-pulverizing coarse particles of a compound semiconductor.

The body particles in the compound semiconductor particles according to the present invention can be obtained by the production process comprising the step of polish-pulverizing coarse particles of a compound semiconductor as raw materials to thereby produce particles having particle diameters of smaller than 1 µm.

The polish-pulverization in the present invention, conceptually, includes pulverization, crushing, and disintegration. Specifically, the polish-pulverization in the present invention, mainly, refers to fining with media mills such as ball mills, beads mills, and sand mills, but also encompasses fining with pulverization apparatuses and disintegration apparatuses such as hammer mills. In addition, the polish-pulverization is classified into a manner under dry conditions (dry manner) and a manner under wet conditions (wet manner), and either of them may be used. However, the wet manner is favorably adopted in that the compound semiconductor particles as dispersed in a solvent can directly be obtained, and in that the temperature control is easy to carry out. In addition, the polish-pulverization in the present invention, conceptually, further includes the following finings: fining the crystal grains by destroying the crystal at random; fining the crystal grains by breaking the crystal walls selectively from crystal wall faces easy to break; fining the polycrystal into a crystal grain level by unbinding the bonding at the grain boundary between crystal grains of the polycrystal; and fining the secondary aggregate into primary particles.

The above compound semiconductor, which is used as a raw material for the body particles, may be any of a single crystal, a polycrystal, and a noncrystal. In addition, the size of the crystal grain or primary particle is not limited. Examples of the kind and properties (e.g. composition, crystal structure) of the above compound semiconductor, which is used as a raw material for the body particles, include the same as those of the compound semiconductor as mentioned in the explanation of the compound semiconductor particles according to the present invention.

If the coarse particles of the compound semiconductor are fined by the polish-pulverization so as to form particles having particle diameters of smaller than 1 µm (nano order), then the functions and properties peculiar to the compound semiconductor particles due to the quantum effects is more enhanced than usual. For example, the luminosity, the luminance, and the luminescence efficiency are enhanced by leaps and bounds in the case of the compound semiconductor particles having the luminescence property. Although a conjecture, the reason for such effects can be considered to be as follows: electrons are efficiently used for excitation of light due to the quantum effects and the nano-sizing effects, so that the obtained light can be efficiently taken out.

In the present invention, because the mixed crystal and/or solid solution of the compound semiconductor having a uniform composition can be used as a raw material being polish-pulverized, excellent results are provided with regard to the uniformity of the composition and functions of individual particles resultant from the polish-pulverization or the subsequent surface covering.

The particle diameters of the above coarse particles of the compound semiconductor, which are used as raw materials for obtaining the body particles of the compound semiconductor particles according to the present invention, are not smaller than micron order. The particle diameters will do if they are large to such an extent as can be decreased to smaller than 1 µm (nano order) by the polish-pulverization. Thus, there is no especial limitation on the particle diameters.

There is no especial limitation on the shape of the above coarse particles of the compound semiconductor. However, examples thereof include any shape such as a spherical shape, a sheet shape, a needle shape, a cubic shape, and an irregular shape.

It is favorable that the polish-pulverization for obtaining the body particles of the compound semiconductor particles according to the present invention is carried out in a solvent. The solvent which can be used may be water. However, organic solvents are favorable, because there is a possibility that defects may be caused by elution of the metal element M and/or the element X from the compound semiconductor into water. Preferred examples of the solvent include: hydrocarbons; halogenated hydrocarbons; alcohols (also including such as phenols, polyhydric alcohols, and their derivatives which are hydroxyl-group-containing compounds); ethers and acetals; ketones and aldehydes; esters; derivative compounds as formed by displacement of active hydrogen atoms of all hydroxyl groups of the polyhydric alcohols with an alkyl group and/or an acetoxy group; carboxylic acids and their anhydrides; silicone oils; and mineral oils. These may be used either alone respectively or in combinations with each other.

When and/or after the coarse particles of the compound semiconductor are polish-pulverized, it is favorable that at least one member (which may hereinafter be referred to simply as "primary-particle formation promoter") selected from the group consisting of carboxylic acids, halide ions, and compounds which form the halide ions in the system of the polish-pulverization treatment (for example, in the above solvent as used for the polish-pulverization treatment) is caused to coexist with the coarse particles of the compound semiconductor and/or with polish-pulverized fine particles of the compound semiconductor. Particularly above all, the carboxylic acids are favorable also from the viewpoint of not having a bad influence upon the covering reaction when there is carried out the reaction of covering the compound semiconductor particles according to the present invention with the metal oxide. And acetic acid is more favorable in that its dispersing effect is high.

Usually, as to the compound semiconductor particles as fined by the polish-pulverization, the smaller their particle diameters are, the more easily the secondary aggregation occurs again. However, if the fined particles are obtained in the coexistence with the above primary-particle formation promoter, then there is easily obtained a high-concentration dispersion in which the above fined particles are dispersed in a primary-particle state. In addition, if the above primary-particle formation promoter is added to a liquid resultant from the polish-pulverization, then there can easily be obtained a dispersion in which the fined particles are dispersed in the primary-particle state by disintegrating the aggregation of the secondary aggregate including the fined particles.

There is no especial limitation on the method for achieving the above coexistence of the primary-particle formation promoter. In addition, the method will do if the promoter is caused to exist in the system including the finally polish-pulverized fine particles of the compound semiconductor. Therefore, there is no especial limitation on the timing of using (adding) the primary-particle formation promoter, either. The promoter may, as aforementioned, be used either during or after the polish-pulverization, or may be used both during and after the polish-pulverization. As to the timing of using the primary-particle formation promoter during the polish-pulverization, for example, the polish-pulverization may be carried out after the following steps of mixing the coarse particles of the compound semiconductor with the solvent and then adding the primary-particle formation promoter to the resultant mixture. Or the polish-pulverization may be carried out after the following steps of beforehand adding the primary-particle formation promoter to the coarse particles of the compound semiconductor and then mixing the resultant mixture with the solvent. Or the polish-pulverization may be carried out after the following steps of beforehand adding the primary-particle formation promoter to the solvent and then mixing the resultant mixture with the coarse particles of the compound semiconductor. Thus, there is no especial limitation on the above timing.

There is no especial limitation on the aforementioned carboxylic acids. However, preferred examples thereof include: saturated aliphatic monocarboxylic acids (e.g. formic acid, acetic acid, propionic acid, butyric acid, lauric acid, and stearic acid); saturated aliphatic dicarboxylic acids (e.g. oxalic acid, malonic acid, succinic acid, glutaric acid, adipic acid, and sebacic acid); unsaturated aliphatic (mono-, di-, and poly)carboxylic acids (e.g. acrylic acid, propiolic acid, methacrylic acid, crotonic acid, maleic acid, fumaric acid, and mesaconic acid); carbon-cyclic (mono-, di-, and poly)carboxylic acids (e.g. benzoic acid, phthalic acid, terephthalic acid, naphthoic acid, toluic acid, hydratropic acid, and cinnamic acid); heterocyclic carboxylic acids (e.g. furoic acid, thenoic acid, nicotinic acid, isonicotinic acid, hydroxycarboxylic acids, and alkoxycarboxylic acids); and other carboxylic acids (e.g. glucolic acid, lactic acid, glyceric acid, malic acid, tartaric acid, benzilic acid, salicylic acid, 3,4-dihydroxybenzoic acid, anisic acid, and piperonylic acid). Of the above, saturated aliphatic monocarboxylic acids having 1 to 4 carbon atoms are more favorable in that they have the high ability to disperse impurities into solvent drops. These may be used either alone respectively or in combinations with each other.

There is no especial limitation on the aforementioned halide ions. However, preferred examples thereof include a fluoride ion ($F^-$), a chloride ion ($Cl^-$), a bromide ion ($Br^-$), and an iodide ion ($I^-$). These may be used either alone respectively or in combinations with each other.

There is no especial limitation on the compounds that form the halide ions in the aforementioned system of the polish-pulverization treatment. However, preferred examples thereof include: hydrogen fluoride, hydrogen chloride, hydrogen bromide, and hydrogen iodide; and their aqueous solutions; and their salts with alkaline metals or alkaline earth metals. These may be used either alone respectively or in combinations with each other.

Although not especially limited, the ratio (mixing ratio) of the aforementioned primary-particle formation promoter as added to the coarse or fine particles of the compound semiconductor to thereby be caused to coexist therewith is, for example, favorably in the range of 0.0001 to 1,000 mol % relative to the number of metal atoms contained in the coarse particles of the compound semiconductor as used. In the case where the above mixing ratio is less than 0.0001 mol %, there is a possibility that the dispersing effect due to the dispersing action may not sufficiently be displayed. In the case where the mixing ratio is more than 1,000 mol %, the enhancement of the dispersing effect is not seen very much even if the amount as used is more increased, or otherwise there is also a possibility that the dispersing effect may be lowered.

In addition, in the case where the primary-particle formation promoter is caused to coexist with the coarse or polish-pulverized fine particles of the compound semiconductor when the aforementioned coarse particles of the compound semiconductor is polish-pulverized, then a trace of fine (usually, particle diameters of not larger than 100 nm) impurity particles that are usually difficult to remove can efficiently be dispersed and floated in the initial stage of the polish-pulverization of the coarse particles. Therefore, there is further obtained an effect such that the resultant fine particles of the compound semiconductor can consequently easily be purified by separating and removing a supernatant or dispersion in the initial stage of the polish-pulverization. For example, Cu and CuSe, which are impurities, and excessive Se can easily be separated and removed from polycrystal particles (e.g. CdSe and ZnS) which are raw materials being subjected to the polish-pulverization.

Although there is no especial limitation on the method for carrying out the above polish-pulverization, yet specific favorable examples thereof include methods that involve using various apparatuses that can give shear force, such as a method that involves using a ball mill (ball-milling method), a method that involves using a sand mill, and a method that involves using a jet mill. Of the above, the ball-milling method is favorable from the viewpoint such that: this method enables uniform preparation of a nano-sized level of particles having particle diameters of smaller than 1 μm and is excellent in economy and productivity and is simple.

In the polish-pulverization by the ball-milling method, balls for the polish-pulverization are usually used. Examples of the balls for the polish-pulverization include: metal balls made of such as stainless steel and titanium; ceramic balls made of such as alumina, silica, and zirconia; and glass balls (glass beads) made of such as glass.

In addition, although not especially limited, the particle diameters of the balls for the polish-pulverization are specifically favorably in the range of 0.1 μm to 10 mm. In the case where the particle diameters are smaller than 0.1 μm, there is a possibility that the use of only these balls for the polish-pulverization may involve a very long polish-pulverization time, so that the productivity may be deteriorated. In the case where the particle diameters are larger than 10 mm, there is a possibility that the use of only these balls for the polish-pulverization cannot polish-pulverize the coarse particles of the compound semiconductor to smaller than 1 μm.

Although there is no especial limitation on the mixing amount of the balls for the polish-pulverization and the coarse particles of the compound semiconductor, yet, specifically for example, the amount of the balls for the polish-pulverization as used is favorably in the range of 100 to 10,000 parts by weight per 100 parts by weight of the coarse particles of the compound semiconductor. In the case where the amount is smaller than 100 parts by weight, there is a possibility that the coarse particles of the compound semiconductor cannot be polish-pulverized to smaller than 1 μm. In the case where the amount is larger than 10,000 parts by weight, there is a possibility that the yield of the compound semiconductor particles per pot may be so low as to deteriorate the productivity.

Although not especially limited, the amount of the solvent as used during the polish-pulverization is, specifically for example, favorably in the range of 1 to 10,000 parts by weight per 100 parts by weight of the coarse particles of the compound semiconductor. In the case where the amount is smaller than 1 part by weight, there is a possibility that the solvent effects (such that the polish-pulverization can efficiently be carried out) cannot be obtained. In the case where the amount is larger than 10,000 parts by weight, there is a possibility that the polish-pulverization efficiency may rather be low.

As to the shape of the pot as used for the ball-milling method, any shape can be adopted and is therefore not especial limited. However, there is usually used a columnar container. The bottom of the pot may be a flat face. However, in the case where an angular portion is formed by the bottom and side of the pot, there is a possibility that the raw materials to be polish-pulverized and the polish-pulverized particles may stagnate around this angular portion, thus resulting in a low yield of the polish-pulverization and a broad particle diameter distribution of the particles as obtained. Therefore, the above angular portion is favorably of the curved shape as formed by removing the angular shape, and the bottom itself is also more favorably a curved face being convex outward of the pot.

Generally as to the ball-milling method, the pot having such as the columnar shape, in which such as the raw materials, the balls for the polish-pulverization, and the solvent are charged, is set in such a manner that the direction vertical to the circular cross section will be horizontal, and then the pot is revolved around its horizontal axis (revolution of the pot) to thereby pulverize the raw materials by the dropping and rubbing of the above balls. However, this pot may further be set on a revolvable disk to carry out the treatment in combination of the aforementioned revolution of the pot and the revolution of this disk. Besides, modes such as a shaker method are favorably cited for example.

In the ball-milling method, there is no especial limitation on the revolution rate of the above pot, but the revolution rate will do if it is fitly set so that there can be obtained the compound semiconductor particles having particle diameters of smaller than 1 μm. However, for example, the revolution rate is favorable in the range of 60 to 10,000 rpm. In the case where the revolution rate is less than 60 rpm, there is a possibility that the polish-pulverization efficiency may be low. In the case where the revolution rate is more than 10,000 rpm, there is a possibility that the polish-pulverized particles may re-aggregate or fuse together to make it difficult to obtain the particles having particle diameters of smaller than 1 μm.

In addition, in the case of also carrying out the above revolution of the disk in combination, the revolution rate of this disk is not especially limited, either. The revolution rate will do if it is fitly set so that there can be obtained the compound semiconductor particles having particle diameters of smaller than 1 μm. However, for example, the revolution rate is favorable in the range of 6 to 10,000 rpm. In the case where the revolution rate is less than 6 rpm, there is a possibility that the effects of the revolution of the disk cannot be obtained. In the case where the revolution rate is more than 10,000 rpm, there is a possibility that the centrifugal force may be too strong, thus resulting in rather a low polish-pulverization efficiency.

The polish-pulverization time in the ball-milling method will do if it is fitly set according to the size and amount of the coarse particles of the compound semiconductor being used as a raw material, and besides, according to operational conditions of the above various ball mills, so that there can be obtained the compound semiconductor particles having particle diameters of smaller than 1 μm. Thus, there is no especial limitation. However, for example, the time is favorably in the range of 0.1 to 100 hours.

In the ball-milling method, the balls for the polish-pulverization can be used in at least two kinds different as to their particle diameters and materials. During the polish-pulverization, different kinds of balls may be used at the same time, or the balls may be used while the kinds of the balls are changed stepwise. For example, if at least two kinds of balls for the polish-pulverization different as to such as their particle diameters are fitly selected and used according to the particle diameters of the objective compound semiconductor particles and/or the size of the coarse particles of the compound semiconductor particles, then particles having desired particle diameters can uniformly be obtained more efficiently. Particularly in the case where particles having smaller particle diameters are intended to be obtained easily, uniformly, and efficiently, it is favorable to fitly select and use at least two kinds of balls for the polish-pulverization different as to such as their particle diameters.

In the present invention, the heat-treatment may be carried out at a temperature of not lower than 50° C. after the polish-pulverization. In addition, the heat-treatment may be carried out at a temperature of not lower than 50° C. after the surface-covering treatment.

The body particles in the compound semiconductor particles according to the present invention will do if the contents, resultant from the polish-pulverization, of the pot are, for example, filtrated to thereby separate and take out the fined compound semiconductor particles from the coarse particles. In detail, it is favorable that: the balls for the polish-pulverization are first separated from the contents, resultant from the polish-pulverization, of the pot, and thereafter the compound semiconductor particles are separated.

The body particles in the compound semiconductor particles according to the present invention are obtained as compound semiconductor particles having particle diameters of smaller than 1 μm, more favorably not larger than 0.1 μm, more favorably not larger than 0.01 μm.

Although not especially limited, the uses of the body particles in the compound semiconductor particles according to the present invention are, for example, favorably the same as mentioned as the uses of the above compound semiconductor particles according to the present invention. In addition, it is also possible that the body particles in the compound semiconductor particles according to the present invention are used as the body particles of the compound semiconductor particles as covered with such as the metal oxide.

The monodispersibility of the compound semiconductor particles according to the present invention is favorably not more than 20, more favorably not more than 10, still more favorably not more than 5. In the case where the above monodispersibility is more than 20, for example, there is a possibility that the functions peculiar to the metal-oxide-covered particles may be displayed insufficiently due to the light-scattering effect caused by the aggregation and also due to the formation of a film in which the particles are non-uniformly dispersed when the particles get contained in a film.

The monodispersibility is shown by the ratio of dispersed-particle diameter/primary-particle diameter, wherein the primary-particle diameter is the average particle diameter of not aggregated single particles as determined from their TEM image (number of particles measured: 50).

[Production Process for Compound Semiconductor Particles]:

The first production process for compound semiconductor particles, according to the present invention, is characterized by comprising the step of heating and/or polish-pulverizing a mixture including a metal carboxylate, an alcohol, and particles or a mixture including a metal-alkoxy-group-containing compound, a carboxyl-group-containing compound, and particles, thereby covering the particles with a metal oxide, wherein the particles include a compound semiconductor.

In the first production process, the metal oxide covering the particles including the compound semiconductor can be formed by heating and/or polish-pulverizing the mixture including the metal carboxylate, the alcohol, and the particles or the mixture including the metal-alkoxy-group-containing compound, the carboxyl-group-containing compound, and the particles (wherein the particles include the compound semiconductor) to thereby run a heat reaction between the metal carboxylate and the alcohol (hereinafter this reaction may be referred to as "first reaction") or a heat reaction between the metal-alkoxy-group-containing compound and the carboxyl-group-containing compound (hereinafter this reaction may be referred to as "second reaction"). In detail, this heat reaction is run by heat as positively applied to the aforementioned mixture and/or by frictional heat as generated with the polish-pulverization of the aforementioned mixture (namely, the polish-pulverization of the particles including the compound semiconductor in the aforementioned mixture), whereby the metal oxide can be formed. If the heat reaction between the metal carboxylate and the alcohol or the heat reaction between the metal-alkoxy-group-containing compound and the carboxyl-group-containing compound is carried out in the presence of the particles including the compound semiconductor in this way, then the particles including the compound semiconductor can be covered with the metal oxide with economy, good productivity, and ease.

Hereinafter, the components that can be contained in the above mixture are explained.

Preferred examples of the compound semiconductor constituting the above particles including the compound semiconductor include the same as mentioned in the explanation of the above compound semiconductor particles according to the present invention.

Although there is no especial limitation on the shape of the above particles including the compound semiconductor, yet examples thereof include a spherical shape, a sheet shape, a needle shape, a columnar shape, and an irregular shape. Particles having a uniform shape and/or a uniform size are favorable.

In addition, the particle diameters of the above particles including the compound semiconductor will do if there are used particles as fitly prepared in such a manner that the particle diameters will be almost the same as those of the resulting compound semiconductor particles in consideration of such as uses of the resulting compound semiconductor particles. Although not especially limited, the particle diameters are favorably smaller than 1 μm, more favorably smaller than 0.1 μm, still more favorably smaller than 0.02 μm. The particle diameters to produce the quantum effects differ depending upon the kinds of the raw substances. However, generally, if the particles are in the nano-sized range such that the particle diameters are smaller than 1 μm, then the same effects as mentioned, in the explanation of the above present invention compound semiconductor particles can be obtained due to the quantum effects. For example, such as the luminescence property can be enhanced more. Incidentally, the above particles including the compound semiconductor can be prepared by applying hitherto publicly known production techniques for compound semiconductor particles.

Although there is no especial limitation on the metal carboxylate as used in the first reaction, yet examples thereof include metal salts of various carboxyl-group-containing compounds as hitherto publicly known. Among these, metal saturated-carboxylates are favorable, and metal acetates are the most favorable. Although there is no especial limitation on the metal (M') contained in the metal carboxylate either, yet it is favorable that the M' is a metal element belonging to such as group 1A, group 2A, group 3A, group 4A, group 5A, group 6A, group 7A, group 8, lanthanoide elements, group 1B, group 2B, group 3B, group 4B, group 5B, or group 6B in the periodic table. Among these, metal elements that can form oxides having no light absorption in the visible range (e.g. Zn, Al, In, Si, Sn, Sb, Y, La, Mg, Ca, Sr, and Ba) are useful and favorable.

The above metal carboxylates may be used either alone respectively or in combinations with each other.

Although there is no especial limitation on the alcohol as used in the first reaction, yet examples thereof include: monohydric alcohols, such as aliphatic monohydric alcohols (e.g. methanol, ethanol, isopropyl alcohol, n-butanol, t-butyl alcohol, and stearyl alcohol), unsaturated aliphatic monohydric alcohols (e.g. allyl alcohol, crotyl alcohol, and propargyl alcohol), alicyclic monohydric alcohols (e.g. cyclopentanol and cyclohexanol), aromatic monohydric alcohols (e.g. benzyl alcohol, cinnamyl alcohol, and methylphenylcarbinol), phenols (e.g. ethylphenol, octylphenol, catechol, xylenol, guaiacol, p-cumylphenol, cresol, m-cresol, o-cresol, p-cresol, dodecylphenol, naphthol, nonylphenol, phenol, benzylphenol, and p-methoxyethylphenol), and heterocyclic monohydric alcohols (e.g. furfuryl alcohol); glycols, such as alkylene glycols (e.g. ethylene glycol, propylene glycol, trimethylene glycol, 1,4-butanediol, 1,5-pentanediol, 1,6-hexanediol, 1,8-octanediol, 1,10-decanediol, pinacol, diethylene glycol, and triethylene glycol), aromatic-ring-containing aliphatic glycols (e.g. hydrobenzoin, benzpinacol, and phthallyl alcohol), alicyclic glycols (e.g. cyclopentane-1,2-diol, cyclohexane-1,2-diol, and cyclohexane-1,4-diol), and polyoxyalkylene glycols (e.g. polyethylene glycol and polypropylene glycol); derivatives, such as monoethers and monoesters, of the above glycols (e.g. propylene glycol monomethyl ether, propylene glycol monoethyl ether, dipropylene glycol monomethyl ether, tripropylene glycol monomethyl ether, 3-methyl-3-methoxybutanol, ethylene glycol monoethyl ether, ethylene glycol monobutyl ether, triethylene glycol monomethyl ether, and ethylene glycol monoacetate); aromatic diols and their monoethers and monoesters (e.g. hydroquinone, resorcin, and 2,2-bis(4-hydroxyphenyl)propane); and trihydric alcohols (e.g. glycerin) and their monoethers, monoesters, diethers, and diesters.

The above alcohols may be used either alone respectively or in combinations with each other.

Although not especially limited, the mixing amount of the alcohol as used in the first reaction is favorably in the range of 1 to 1,000 times, more favorably 2 to 100 times, particularly favorably 5 to 50 times, in molar ratio to the content of the metal of the above metal carboxylate.

The metal-alkoxy-group-containing compound as used in the second reaction is not especially limited. However, examples thereof include: compounds shown by the following general formula (1); and their (partially) hydrolyzed and condensed products.

(1)

(wherein: M is a metal atom; $R^a$ is at least one species selected from among a hydrogen atom, alkyl groups, cycloalkyl groups, acyl groups, aralkyl groups, and aryl groups (wherein these groups may have a substituent); $R^b$ is at least one species selected from among a hydrogen atom, alkyl groups, cycloalkyl groups, acyl groups, aralkyl groups, aryl groups, unsaturated aliphatic residues, and organic groups containing functional groups other than the $OR^a$ groups (wherein these groups may have a substituent); n is the valence of the metal atom M; and m is an integer in the range of 0 to n−1).

In the general formula (1), $R^a$ is favorably a hydrogen atom and/or an alkyl group which may have a substituent, such as an alkoxyalkyl group. In addition, $R^b$ is favorably at least one species selected from among alkyl groups, cycloalkyl groups, acyl groups, aralkyl groups, aryl groups, unsaturated aliphatic residues, and organic groups containing functional groups other than the $OR^a$ groups such as β-diketone compounds (wherein these groups may have a substituent).

In the general formula (1), examples of M include the metals as contained in the above metal carboxylates, and preferable examples of M also include the same as those of the metals as contained in the above metal carboxylates.

In the general formula (1), examples of metal-alkoxy-group-containing compounds of m=1, 2 or 3 include a variety of: organosilicon compounds (m=1, 2 or 3), titanate type coupling agents (m=1, 2 or 3), and aluminate type coupling agents (m=1 or 2).

Examples of the organosilicon compounds include: vinyl type silane coupling agents such as vinyltrimethoxysilane, vinyltriethoxysilane, vinyltris(β-methoxyethoxy)silane, and vinyltriacetoxysilane; amino type silane coupling agents such as N-(2-aminoethyl)-3-aminopropylmethyldimethoxysilane, 3-N-phenyl-γ-aminopropyltrimethoxysilane, and N,N'-bis[3-(trimethoxysilyl)propyl]ethylenediamine; epoxy type silane coupling agents such as γ-glycidoxypropyltrimethoxysilane and β-(3,4-epoxycyclohexyl)ethyltrimethoxysilane; chloro type silane coupling agents such as 3-chloropropyltrimethoxysilane; methacryloxy type silane coupling agents such as 3-methacryloxypropyltrimethoxysilane; mercapto type silane coupling agents such as 3-mercaptopropyltrimethoxysilane; ketimine type silane coupling agents such as N-(1,3-dimethylbutylidene)-3-(triethoxysilyl)-1-propanamine; cationic silane coupling agents such as N-[2-(vinylbenzylamino)ethyl]-3-aminopropyltrimethoxysilane hydrochloride; alkyl type silane coupling agents such as methyltrimethoxysilane, trimethylmethoxysilane, decyltriethoxysilane, and hydroxyethyltrimethoxysilane; and γ-ureidopropyltriethoxysilane.

Examples of the titanate type coupling agents include isopropyltriisostearoyl titanate, isopropyltrioctanoyl titanate, tetraoctylbis(ditridecylphosphite)titanate, tetraisopropylbis(dioctylphosphite)titanate, tetraisopropyltris(dioctylpyrophosphate)titanate, bis(dioctylpyrophosphate)oxyacetate titanate, bis(dioctylpyrophosphate)ethylene titanate, isopropyltri(dioctylphosphate)titanate, isopropyltri(N-aminoethylaminoethyl)titanate, tetra(2,2-diallyloxymethyl-1-butyl)bis(ditridecyl)phosphite titanate, isopropyldimethacrylisostearoyl titanate, isopropyltridecylbenzenesulfonyl titanate, and isopropyltricumylphenyl titanate.

Examples of the aluminate type coupling agents include diisopropoxyaluminum ethylacetoacetate, diisopropoxyaluminum alkylacetoacetates, diisopropoxyaluminum monomethacrylate, isopropoxyaluminum alkylacetoacetate mono(dioctylphosphate), and cyclic aluminum oxide isopropylate.

The metal-alkoxy-group-containing compound may be other than the above-explained ones. Examples thereof may include: metal alkoxide compounds of m=0 in the general formula (1), such as tetramethoxysilane, tetra-n-butoxysilane, tetra-n-butoxytitanium, tri-n-butoxyaluminum, tetraisopropoxytin, and indium trimethoxyethoxide; and heterometal-alkoxy-group-containing compounds (also including heterometal-oxoalkoxy-group-containing compounds). Incidentally, the heterometal-alkoxy-group-containing compounds refer to metal-alkoxy-group-containing compounds which have at least two different metal atoms that are bonded to each other through an alkoxy group or oxygen atom or through such as metal-metal bonding. In the case where the heterometal-alkoxy-group-containing compounds are used, metal oxides including composite oxides can be obtained.

The above metal-alkoxy-group-containing compounds may be used either alone respectively or in combinations with each other.

There is no especial limitation on the carboxyl-group-containing compound used in the second reaction, if it is a compound having at least one carboxyl group in its molecule. Examples thereof include: chain carboxylic acids such as saturated fatty acids (saturated monocarboxylic acids) (e.g. formic acid, acetic acid, propionic acid, isobutyric acid, caproic acid, caprylic acid, lauric acid, myristic acid, palmitic acid, and stearic acid), unsaturated fatty acids (unsaturated monocarboxylic acids) (e.g. acrylic acid, methacrylic acid, crotonic acid, oleic acid, and linolenic acid), saturated polycarboxylic acids (e.g. oxalic acid, malonic acid, succinic acid, adipic acid, suberic acid, and β,β-dimethylglutaric acid), and unsaturated polycarboxylic acids (e.g. maleic acid and fumaric acid); cyclic saturated carboxylic acids such as cyclohexanecarboxylic acid; aromatic carboxylic acids such as aromatic monocarboxylic acids (e.g. benzoic acid, phenylacetic acid, and toluic acid) and unsaturated polycarboxylic acids (e.g. phthalic acid, isophthalic acid, terephthalic acid, pyromellitic acid, and trimellitic acid); carboxylic anhydrides such as acetic anhydride, maleic anhydride, and pyromellitic anhydride; compounds having another functional or atomic group (e.g. a hydroxyl group, an amino group, a nitro group, an alkoxy group, a sulfonic acid group, a cyano group, a halogen atom) besides the carboxyl group in their molecules, such as trifluoroacetic acid, o-chlorobenzoic acid, o-nitrobenzoic acid, anthranilic acid, p-aminobenzoic acid, anisic acid (p-methoxybenzoic acid), toluic acid, lactic acid, and salicylic acid (o-hydroxybenzoic acid); and polymers of which the starting materials include at least one of the above unsaturated carboxylic acids, such as homopolymer of acrylic acid and copolymer of acrylic acid and methyl methacrylate. Of these carboxyl-group-containing compounds, the saturated carboxylic acids are favorable, and acetic acid is the most favorable, for obtaining particles having excellent dispersibility. In addition, in the case where the carboxyl-group-containing compound is liquid, it is also possible to use this compound also as the below-mentioned reaction solvent.

The above carboxyl-group-containing compounds may be used either alone respectively or in combinations with each other.

As to the carboxyl-group-containing compound used in the second reaction, there is no especial limitation on the mixing ratio between the metal-alkoxy-group-containing compound and the carboxyl-group-containing compound (metal-alkoxy-group-containing compound/carboxyl-group-containing compound). However, the lower limit of the above mixing ratio is favorably more than 0.8 n, more favorably more than 2 n, and also the upper limit of the above mixing ratio is favorably less than 10 n, wherein "n" is the valence of the metal atom M as contained in the metal-alkoxy-group-containing compound.

In the production process according to the present invention, the mixture including the metal carboxylate, the alcohol, and the particles or the mixture including the metal-alkoxy-group-containing compound, the carboxyl-group-containing compound, and the particles (wherein the particles include the compound semiconductor) may further include such as a reaction solvent.

There is no especial limitation on the amount of the reaction solvent as used. However, in the mixture including the metal carboxylate, the alcohol, and particles (wherein the particles include the compound semiconductor), the amount of the reaction solvent as used is favorably set in such a manner that the concentration of the metal carboxylate will be in the range of 1 to 50 weight % relative to the total of the metal carboxylate, the alcohol, and the reaction solvent. In addition, in the mixture including the metal-alkoxy-group-containing compound, the carboxyl-group-containing compound, and the particles (wherein the particles include the compound semiconductor), the amount of the reaction solvent as used is favorably set in such a manner that the concentration of the metal-alkoxy-group-containing compound will be in the range of 1 to 50 weight % relative to the total of the metal-alkoxy-group-containing compound, the carboxyl-group-containing compound, and the reaction solvent. Thereby, the compound semiconductor particles as covered with the metal oxide can be obtained economically.

As to the reaction solvent, solvents other than water, in other words, non-aqueous solvents, are favorable. Examples of the non-aqueous solvents include: hydrocarbons; halogenated hydrocarbons; alcohols (also including such as phenols, polyhydric alcohols, and their derivatives which are hydroxyl-group-containing compounds); ethers and acetals; ketones and aldehydes; esters; derivative compounds as formed by displacement of active hydrogen atoms of all hydroxyl groups of the polyhydric alcohols with an alkyl group and/or an acetoxy group; carboxylic acids and their anhydrides; silicone oils; and mineral oils.

Examples of the above hydrocarbons include amylbenzene, isopropylbenzene, ethylbenzene, octane, gasoline, xylenes, diethylbenzene, cyclohexane, cyclohexylbenzene, cyclohexene, cyclopentane, dimethylnaphthalene, cymenes, camphor oil, styrene, petroleum ether, petroleum benzine, solvent naphtha, decalin, decane, tetralin, turpentine oil, kerosine, dodecane, dodecylbenzene, toluene, naphthalene, nonane, pine oil, pinene, biphenyl, butane, propane, hexane, heptane, benzene, pentane, mesitylene, methylcyclohexane, methylcyclopentane, p-menthane, ligroin, and liquid paraffin.

Examples of the above halogenated hydrocarbons include allyl chloride, 2-ethylhexyl chloride, amyl chloride, isopropyl chloride, ethyl chloride, chlorinated naphthalenes, butyl chloride, hexyl chloride, methyl chloride, methylene chloride, o-chlorotoluene, p-chlorotoluene, chlorobenzene, chloroform, carbon tetrachloride, 1,1-dichloroethane, 1,2-dichloroethane, 1,1-dichloroethylene, 1,2-dichloroethylene, 2,3-dichlorotoluene, 2,4-dichlorotoluene, 2,5-dichlorotoluene, 2,6-dichlorotoluene, 3,4-dichlorotoluene, 3,5-dichlorotoluene, dichlorobutanes, dichloropropane, m-dichlorobenzene, o-dichlorobenzene, p-dichlorobenzene, dibromoethane, dibromobutane, dibromopropane, dibromobenzene, dibromopentane, allyl bromide, isopropyl bromide, ethyl bromide, octyl bromide, butyl bromide, propyl bromide, methyl bromide, lauryl bromide, 1,1,1,2-tetrachloroethane, 1,1,2,2-tetrachloroethane, tetrachloroethylene, tetrabromoethane, tetramethylene chlorobromide, 1,1,1-trichloroethane, 1,1,2-trichloroethane, trichloroethylene, 1,2,3-trichlorobenzene, 1,2,4-trichlorobenzene, 1,3,5-trichlorobenzene, bromochloroethane, 1-bromo-3-chloropropane, bromonaphthalene, hexachloroethane, and pentamethylene chlorobromide.

Preferred examples of the above alcohols (including phenols, polyhydric alcohols, and their derivatives which are hydroxyl-group-containing compounds) include the same as enumerated as examples of the alcohol contained in the above mixture.

Examples of the above ethers and acetals include anisole, ethyl isoamyl ether, ethyl t-butyl ether, ethyl benzyl ether, epichlorohydrin, epoxybutane, crown ethers, cresyl methyl ether, propylene oxide, diisoamyl ether, diisopropyl ether, diethyl acetal, diethyl ether, dioxane, diglycidyl ether, 1,8-cineol, diphenyl ether, dibutyl ether, dipropyl ether, dibenzyl ether, dimethyl ether, tetrahydropyran, tetrahydrobifuran, trioxane, bis(2-chloroethyl)ether, vinyl ethyl ether, vinyl methyl ether, phenetole, butyl phenyl ether, furan, furfural, methylal, methyl t-butyl ether, methylfuran, and monochlorodiethyl ether.

Examples of the above ketones and aldehydes include acrolein, acetylacetone, acetaldehyde, acetophenone, acetone, isophorone, ethyl n-butyl ketone, diacetone alcohol, diisobutyl ketone, diisopropyl ketone, diethyl ketone, cyclohexanone, di-n-propyl ketone, phorone, mesityl oxide, methyl n-amyl ketone, methyl isobutyl ketone, methyl ethyl ketone, methylcyclohexanone, methyl n-butyl ketone, methyl n-propyl ketone, methyl n-hexyl ketone, and methyl n-heptyl ketone.

Examples of the above esters include diethyl adipate, dioctyl adipate, triethyl acetylcitrate, tributyl acetylcitrate, allyl acetoacetate, ethyl acetoacetate, methyl acetoacetate, methyl abietate, isoamyl benzoate, ethyl benzoate, butyl benzoate, propyl benzoate, benzyl benzoate, methyl benzoate, isoamyl isovalerate, ethyl isovalerate, isoamyl formate, isobutyl formate, ethyl formate, butyl formate, propyl formate, hexyl formate, benzyl formate, methyl formate, tributyl citrate, ethyl cinnamate, methyl cinnamate, amyl acetate, isoamyl acetate, isobutyl acetate, isopropyl acetate, ethyl acetate, 2-ethylhexyl acetate, cyclohexyl acetate, n-butyl acetate, s-butyl acetate, propyl acetate, benzyl acetate, methyl acetate, methylcyclohexyl acetate, isoamyl salicylate, benzyl salicylate, methyl salicylate, diamyl oxalate, diemyl oxalate, dibutyl oxalate, diethyl tartarate, dibutyl tartarate, amyl stearate, ethyl stearate, butyl stearate, dioctyl sebacate, dibutyl sebacate, diethyl carbonate, diphenyl carbonate, dimethyl carbonate, amyl lactate, ethyl lactate, butyl lactate, methyl lactate, diethyl phthalate, dioctyl phthalate, dibutyl phthalate, dimethyl phthalate, γ-butyrolactone, isoamyl propionate, ethyl propionate, butyl propionate, benzyl propionate, methyl propionate, borate esters, dioctyl maleate, diisopropyl maleate, diethyl malonate, dimethyl malonate, isoamyl butyrate, isopropyl butyrate, ethyl butyrate, butyl butyrate, methyl butyrate, and phosphate esters.

Examples of the above derivative compounds, as formed by displacement of active hydrogen atoms of all hydroxyl groups of the polyhydric alcohols with an alkyl group and/or an acetoxy group, include ethylene carbonate, ethylene glycol diacetate, ethylene glycol diethyl ether, ethylene glycol diglycidyl ether, ethylene glycol dibutyl ether, ethylene glycol dimethyl ether, ethylene glycol monoethyl ether acetate, ethylene glycol monobutyl ether acetate, diethylene glycol ethyl methyl ether, diethylene glycol diacetate, diethylene glycol diethyl ether, diethylene glycol dibutyl ether, diethylene glycol dibenzoate, diethylene glycol dimethyl ether, diethylene glycol monoethyl ether acetate, diethylene glycol monobutyl ether acetate, triethylene glycol di-2-ethylbutyrate, triethylene glycol dimethyl ether, polyethylene glycol fatty acid diesters, poly(oxyethylene)derivatives containing no hydroxyl group at both ends, and poly(oxypropylene) derivatives containing no hydroxyl group at both ends.

In the case where the compound semiconductor particles are produced by utilizing the first reaction in the first production process according to the present invention, the amount of the metal carboxylate as used is favorably in the range of 10 to 10,000 parts by weight per 100 parts by weight of the particles including the compound semiconductor. In the case where the amount is smaller than 10 parts by weight, there is a possibility that the particles including the compound semiconductor may not be covered with the metal oxide to such an extent that the covering effects can sufficiently be obtained. In the case where the amount is larger than 10,000 parts by weight, there is a possibility that: the particles including the compound semiconductor may be covered with the metal oxide which is thicker than is necessary, or much of the metal oxide may be formed in the form of such as particles without being provided to the covering.

In the case where the compound semiconductor particles are produced by utilizing the second reaction in the first production process according to the present invention, the amount of the metal-alkoxy-group-containing compound as used is favorably in the range of 10 to 10,000 parts by weight per 100 parts by weight of the particles including the compound semiconductor. If the amount of the metal-alkoxy-group-containing compound as used is set so as to satisfy the above range, then the covering with the metal oxide is easily made upon surfaces of the particles including the compound semiconductor, and besides, the particles are covered with a crystalline metal oxide, so that the effects by the covering can sufficiently be obtained. In addition, in the case where the amount of the metal-alkoxy-group-containing compound as used is smaller than 10 parts by weight per 100 parts by weight of the particles including the compound semiconductor, there is a possibility that the covering with the metal oxide may be difficult to make uniformly throughout the entire surface of the particle including the compound semiconductor, and there is a possibility that, even if the covering is not made throughout the entire surface, the covering may not be made with a uniform distribution. Besides, there are disadvantages in that the covering with the crystalline metal oxide is difficult to make. In addition, in the case where the amount of the metal-alkoxy-group-containing compound as used is larger than 10,000 parts by weight per 100 parts by weight of the particles including the compound semiconductor, there is a possibility that: the particles including the compound semiconductor may be covered with the metal oxide which is thicker than is necessary, or much of the metal oxide may be formed in the form of such as particles without being provided to the covering.

In the first production process according to the present invention, it is favorable that the metal compound provided to the covering is a metal oxide to which the acyloxyl group is bonded. If the metal oxide to which the acyloxyl group is bonded is provided to the covering, then there can further be enhanced various effects due to the covering with the metal oxide, particularly, the dispersibility into various mediums. Examples of the acyloxyl group include an acetoxy group (ethanoyloxy group), a propionyloxy group, and an 2-ethylhexanoyloxy group. However, above all, the acetoxy group (ethanoyloxy group) is particularly favorable.

Hereinafter, more detailed explanations are made about the heating of the mixture including the metal carboxylate, the alcohol, and the particles including the compound semiconductor or the mixture including the metal-alkoxy-group-containing compound, the carboxyl-group-containing compound, and the particles including the compound semiconductor (the first production process by the heating). Thereafter, explanations are made also about the polish-pulverization of the above mixture (the first production process by the polish-pulverization).

In the first production process by the heating, when the first or second reaction is utilized, the heating temperature is usually favorably not lower than 50° C. And, more favorably for shortening the time to obtain the compound semiconductor particles as covered with the metal oxide, the heating temperature is not lower than 100° C. In addition, still more favorably for suppressing the cohesion between the covered particles as obtained, the heating temperature is not higher than 300° C.

In the first production process by the heating, the lower water content in the above mixture is preferable in that the compound semiconductor particles are more easily covered with the metal oxide. Specifically, the amount of water as contained (water content) in the above mixture is favorably so slight as to be less than 4, more favorably less than 1, still more favorably less than 0.2, particularly favorably less than 0.1, in molar ratio to the metal atom of the metal carboxylate contained in the above mixture or to the metal atom of the metal-alkoxy-group-containing compound contained in the above mixture.

The first production process by the heating may be carried out under any pressure selected from among normal pressure, applied pressure, and reduced pressure. In the case where the boiling point of such as the reaction solvent is lower than the reaction temperature, that will do if the reaction is carried out with a pressure-resistant reaction apparatus. Usually, the reaction is carried out in such a manner that the reaction temperature and the gas phase pressure during the reaction are not higher than the critical points of the solvent. However, it is also possible that the reaction is carried out under supercritical conditions.

Hereinafter, the specific operational procedure for carrying out the first production process by the heating is explained by classifying it into a case utilizing the first reaction and a case utilizing the second reaction.

Although there is no especial limitation on the specific operational procedure in the case utilizing the first reaction, yet examples thereof include: (1a) a method including the steps of preparing the mixture including the metal carboxylate, the alcohol, and the particles including the compound semiconductor, and then heating this mixture to raise its temperature; (2a) a method including the step of mixing the heated alcohol with the metal carboxylate and the particles including the compound semiconductor; (3a) a method including the step of mixing the heated alcohol and the heated particles including the compound semiconductor with the metal carboxylate; (4a) a method including the steps of heating the reaction solvent and the metal carboxylate, and thereafter mixing them with the alcohol and the particles including the compound semiconductor; (5a) a method including the steps of heating the reaction solvent, the metal carboxylate, and the particles including the compound semiconductor, and thereafter mixing them with the alcohol; and (6a) a method including the step of mixing the components, which can constitute the mixture and are in a heated state, and the particles including the compound semiconductor together. In addition, in the above methods (3a) and (5a), the metal carboxylate in the case of the method (3a) and the alcohol in the case of the method (5a) are little by little pulsewise added or slowly fed-added favorably for gradually making the formation of a covering film by the metal oxide to form a uniform metal oxide layer on surfaces of the particles including the compound semiconductor.

In the case utilizing the first reaction, it is favorable to use the methods (3a) and (5a), more favorably the method (3a), among the above operational procedures. By these methods, the individual single particles including the compound semiconductor can sufficiently be covered with the metal oxide uniformly and efficiently. As is mentioned above, when the method (3a) is carried out, it is favorable to mix (add) the metal carboxylate by the continuous feed or the pulse addition. However, the addition rate of the metal carboxylate is favorably not more than 0.5 part/minute, more favorably 0.2 part/minute, in terms of metal oxide per 1 part by weight of the particles including the compound semiconductor. In the case where the above addition rate is more than 0.5 part/minute, there is a possibility that the ratio of the covering upon the particles including the compound semiconductor may be so low that fine particles of the metal oxide tend to form alone and mingle.

In the above methods (2a) to (6a), particularly in the method (3a), it is favorable to keep the reaction temperature constant during the mixing (addition) (from the beginning till the end of the mixing (addition)). Specifically, it is favorable to keep the reaction temperature in the range of ±10° C., more favorably ±5° C., still more favorably ±2° C., around the predetermined reaction temperature. In the case where the variation of the reaction temperature during the mixing (addition) is more than ±10° C., there is a possibility that the ratio of the covering upon the particles including the compound semiconductor may be so low that fine particles of the metal oxide tend to form alone and mingle. This is remarkable particularly in the case where the reaction temperature rises by its variation of more than +10° C.

Although there is no especial limitation on the specific operational procedure in the case utilizing the second reaction, yet examples thereof include: (1b) a method including the steps of preparing the mixture including the metal-alkoxy-group-containing compound, the carboxyl-group-containing compound, and the particles including the compound semiconductor, and then heating this mixture to raise its temperature; (2b) a method including the step of mixing the heated carboxyl-group-containing compound with the metal-alkoxy-group-containing compound and the particles including the compound semiconductor; (3b) a method including the step of mixing the heated carboxyl-group-containing compound and the heated particles including the compound semiconductor with the metal-alkoxy-group-containing compound; (4b) a method including the steps of heating the reaction solvent and the metal-alkoxy-group-containing compound, and thereafter mixing them with the carboxyl-group-containing compound and the particles including the compound semiconductor; (5b) a method including the steps of heating the reaction solvent, the metal-alkoxy-group-containing compound, and the particles including the compound semiconductor, and thereafter mixing them with the carboxyl-group-containing compound; and (6b) a method including the step of mixing the components, which can constitute the mixture and are in a heated state, and the particles including the compound semiconductor together. Above all, in the above methods (3b) and (5b), the metal-alkoxy-group-containing compound in the case of the method (3b) and the carboxyl-group-containing compound in the case of the method (5b) are little by little pulsewise added or slowly continuously fed-added favorably for gradually making the formation of a covering film by the metal oxide to form a uniform metal oxide layer on surfaces of the particles including the compound semiconductor.

In the case utilizing the second reaction, it is favorable to use the methods (3b) and (5b), more favorably the method (3b), among the above operational procedures. By these methods, the individual single particles including the compound semiconductor can sufficiently be covered with the metal oxide uniformly and efficiently. As is mentioned above, when the method (3b) is carried out, it is favorable to mix (add) the metal-alkoxy-group-containing compound by the continuous feed or the pulse addition in the above way. However, the addition rate of the metal-alkoxy-group-containing compound is favorably not more than 0.5 part/minute, more favorably 0.2 part/minute, in terms of metal oxide per 1 part by weight of the particles including the compound semiconductor. In the case where the above addition rate is more than 0.5 part/minute, there is a possibility that the ratio of the covering upon the particles including the compound semiconductor may be so low that fine particles of the metal oxide tend to form alone and mingle.

In the above methods (2b) to (6b), particularly in the method (3b), similarly to the above case utilizing the first reaction, it is favorable to keep the reaction temperature constant during the mixing (addition) (from the beginning till the end of the mixing (addition)). Specifically, it is favorable to keep the reaction temperature in the range of ±10° C., more favorably ±5° C., still more favorably ±2° C., around the predetermined reaction temperature. In the case where the variation of the reaction temperature during the mixing (addition) is more than ±10° C., there is a possibility that the ratio of the covering upon the particles including the compound semiconductor may be so low that fine particles of the metal oxide tend to form alone and mingle. This is remarkable particularly in the case where the reaction temperature rises by its variation of more than +10° C.

In the first production process by the polish-pulverization, the mixture including the metal carboxylate, the alcohol, and the particles including the compound semiconductor or the mixture including the metal-alkoxy-group-containing compound, the carboxyl-group-containing compound, and the particles including the compound semiconductor is polish-pulverized (specifically, the particles including the compound semiconductor in the above mixture are polish-pulverized) so that the first or second reaction can be made by heat (thermal energy) as generated by the frictional force during this polish-pulverization. Specific examples of methods therefor include: (7a) a method including the steps of adding the coarse particles of the compound semiconductor to the mixture including the metal carboxylate and the alcohol (if necessary, further including the solvent for the polish-pulverization), and thereafter polish-pulverizing the resultant mixture; and (7b) a method including the steps of adding the coarse particles of the compound semiconductor to the mixture including the metal-alkoxy-group-containing compound and the carboxyl-group-containing compound (if necessary, further including the solvent for the polish-pulverization), and thereafter polish-pulverizing the resultant mixture. As to various treatment conditions for the polish-pulverization when this first production process by the polish-pulverization is carried out, there can be favorably applied such as the aforementioned various conditions and procedures.

Usually, when the polish-pulverization is carried out such as by the ball-milling method, the fractional heat is generated between the ball for the polish-pulverization or the inner surface of the pot and the substance used as a raw material. If the first or second reaction is carried out by this frictional heat, then particles (favorably, nano-sized particles having particle diameters of smaller than 1 μm) as fined by the polish-pulverization can be obtained, and also, these particles can be covered with the metal oxide. Therefore, the above covering can economically and extremely easily be carried out. In addition, because the surfaces of the compound semiconductor particles come in a higher energy (temperature) state than the solvent, the first or second reaction becomes so easy to cause selectively on the aforementioned particle surfaces that: the covering can efficiently be carried out, and besides, the formation of lone particles of the metal oxide can be suppressed, thus resulting also in excellent productivity.

In the first production process according to the present invention, both the heating and polish-pulverization of the above mixture may be carried out. The heating and the polish-pulverization may be carried out at the same time, or the polish-pulverization may be carried out before or after the heating. For example, while the polish-pulverization is carried out and while the heat generated by the friction (frictional heat) is utilized for the first or second reaction, the heating may fitly further be carried out.

In the case where the heating and the polish-pulverization are carried out (namely, the heating and the polish-pulverization are carried out at the same time) in the first production process according to the present invention, it is also possible that the above favorable various treatment conditions are applied, as they are, to each of the heating and the polish-pulverization. However, for example, it is favorable also for such as economy and productivity that both of them are carried out under conditions milder than the above favorable various treatment conditions. These findings can be applied, for example, to the case where, while the heat generated by the friction (frictional heat) in the polish-pulverization is utilized for the first or second reaction, the heating is fitly further carried out.

In the first production process according to the present invention, particles as obtained by a process including the step of polish-pulverizing the coarse particles of the compound semiconductor to thereby fine the particles can be used as the particles including the compound semiconductor that are used as raw materials. If the particles as beforehand polish-pulverized is used, then, for example, the aforementioned nano-sized level of particles having particle diameters of smaller than 1 µm can be obtained with economy, good productivity, and ease. The above particles as obtained by the polish-pulverization can be prepared in the same way as of the polish-pulverization as explained about the compound semiconductor particles according to the present invention.

In the case where the particles as obtained by the polish-pulverization are used in the first production process by the heating, there can be adopted a method including the steps of: fining the particles by the polish-pulverization; and thereafter separating and taking out the resultant particles by such as filtration; and thereafter either causing the particles to exist in the mixture including the metal carboxylate and the alcohol to heat them by such as the above operational procedures (1a) to (6a) or causing the particles to exist in the mixture including the metal-alkoxy-group-containing compound and the carboxyl-group-containing compound to heat them by such as the above operational procedures (1b) to (6b). In addition, in the case where the first reaction is used, examples of other methods include: (8a) a method including the steps of carrying out the above polish-pulverization in the presence of the metal carboxylate (if necessary, the solvent for the polish-pulverization is also used), and then, after this treatment, adding the alcohol, and then heating the resultant mixture; and (9a) a method including the steps of carrying out the above polish-pulverization in the presence of the alcohol (if necessary, the solvent for the polish-pulverization is also used), and then, after this treatment, adding the metal carboxylate, and then heating the resultant mixture. In the case where the second reaction is used, examples of other methods include: (8b) a method including the steps of carrying out the above polish-pulverization in the presence of the metal-alkoxy-group-containing compound (if necessary, the solvent for the polish-pulverization is also used), and then, after this treatment, adding the carboxyl-group-containing compound, and then heating the resultant mixture; and (9b) a method including the steps of carrying out the above polish-pulverization in the presence of the carboxyl-group-containing compound (if necessary, the solvent for the polish-pulverization is also used), and then, after this treatment, adding the metal-alkoxy-group-containing compound, and then heating the resultant mixture.

In the case where the particles as obtained by the polish-pulverization are used in the first production process by the polish-pulverization, there can be adopted a method including the steps of: fining the particles by the polish-pulverization; and thereafter separating and taking out the resultant particles by such as filtration; and thereafter causing the particles to exist in the mixture including the metal carboxylate and the alcohol or in the mixture including the metal-alkoxy-group-containing compound and the carboxyl-group-containing compound to polish-pulverize them by such as the above operational procedure (7a) or (7b). In addition, in the case where the first reaction is used, examples of other methods include: (10a) a method including the steps of polish-pulverizing the coarse particles of the compound semiconductor in the presence of the metal carboxylate (if necessary, the solvent for the polish-pulverization is also used), and then, or while carrying out the above polish-pulverization, adding the alcohol, and then continuing the polish-pulverization; and (11a) a method including the steps of polish-pulverizing the coarse particles of the compound semiconductor in the presence of the alcohol (if necessary, the solvent for the polish-pulverization is also used), and then, or while carrying out the above polish-pulverization, adding the metal carboxylate, and then continuing the polish-pulverization. In the case where the second reaction is used, examples of other methods include: (10b) a method including the steps of polish-pulverizing the coarse particles of the compound semiconductor in the presence of the metal-alkoxy-group-containing compound (if necessary, the solvent for the polish-pulverization is also used), and then, or while carrying out the above polish-pulverization, adding the carboxyl-group-containing compound, and then continuing the polish-pulverization; and (11b) a method including the steps of polish-pulverizing the coarse particles of the compound semiconductor in the presence of the carboxyl-group-containing compound (if necessary, the solvent for the polish-pulverization is also used), and then, or while carrying out the above polish-pulverization, adding the metal-alkoxy-group-containing compound, and then continuing the polish-pulverization.

If the above method (10a) or (10b) or the above method (11a) or (11b) is carried out, then the particles as obtained by the polish-pulverization can finally be covered with the metal oxide more uniformly, because the polish-pulverization is beforehand carried out as the pretreatment before the reaction.

In the first production process according to the present invention, it is intended that the particles including the compound semiconductor can be covered with the metal oxide in a state where the particles are more dispersed in the form of primary particles. Therefore, it is favorable to carry out the covering reaction in the presence of the aforementioned primary-particle formation promoter. It is enough that the primary-particle formation promoter and the particles including the compound semiconductor are allowed to coexist when or before the heating and/or polish-pulverization to run the covering reaction is carried out. There is no especial limitation on its method or timing. If the above way is carried out, then there can effectively be suppressed the formation of particles such that a secondary aggregate of the particles including the compound semiconductor is covered with the metal oxide, and there can easily be obtained particles such that the particles including the compound semiconductor which are primary particles are covered with the metal oxide.

In addition, in the first production process by the polish-pulverization, it is favorable that the particles including the compound semiconductor is polish-pulverized in the presence of the aforementioned primary-particle formation promoter. It is enough that the primary-particle formation promoter and the particles including the compound semiconductor are allowed to coexist during the above polish-pulverization. There is no especial limitation on its method or timing. As to the particles including the compound semiconductor as fined by the polish-pulverization, the smaller their particle diameters are, the more easily the particles secondarily aggregate again. However, if the above fined particles are obtained in the presence of the primary-particle formation promoter, then the covering reaction with the metal oxide can be carried out with the above fined particles left dispersed more in a primary-particle state. As a result, therefore, finer particles as covered with the metal oxide can be obtained easily in a high yield.

Although not especially limited, the ratio (mixing ratio) of the aforementioned primary-particle formation promoter as added to the coarse or fine particles of the compound semiconductor to thereby be caused to coexist therewith is, for example, favorably in the range of 0.0001 to 1,000 mol % relative to the number of metal atoms contained in the particles including the compound semiconductor as used. In the case where the above mixing ratio is less than 0.0001 mol %, there is a possibility that the dispersing effect due to the dispersing action may not sufficiently be displayed. In the case where the mixing ratio is more than 1,000 mol %, the enhancement of the dispersing effect is not seen very much even if the amount as used is more increased, or otherwise there is also a possibility that the dispersing effect may be lowered.

In the first production process according to the present invention, it is also possible that surfaces of the resultant compound semiconductor particles are further treated (secondarily treated) by adding a surface-treating agent to a liquid as obtained by heating and/or polish-pulverizing the mixture including the metal carboxylate, the alcohol, and the particles including the compound semiconductor or the mixture including the metal-alkoxy-group-containing compound, the carboxyl-group-containing compound, and the particles including the compound semiconductor. In addition, the surface-treating agent may be added during the above heating and/or polish-pulverization.

Examples of the surface-treating agent include: various dispersants as enumerated in the above description of the compound semiconductor particles according to the present invention; and substances as predetermined for the use for medical markers (surface-treating substances (A)). There is no especial limitation on the amount of the surface-treating agent as used. This amount will do if it is fitly set.

In the first production process for compound semiconductor particles according to the present invention, the particles including the compound semiconductor may be heat-treated at a temperature of not lower than 50° C. before being covered with the metal oxide. Also, the particles including the compound semiconductor may be heat-treated at a temperature of not lower than 50° C. after being covered with the metal oxide. If the particles is heat-treated in these ways, then there is, for example, a case where the properties, particularly the luminescence property, of the resulting compound semiconductor particles are enhanced.

Although not especially limited, the uses of the compound semiconductor particles as obtained by the first production process according to the present invention are favorably the same uses as of the above compound semiconductor particles according to the present invention.

The second production process for compound semiconductor particles, according to the present invention, is characterized by comprising the steps of: polish-pulverizing coarse particles of a compound semiconductor to thereby obtain particles having particle diameters of smaller than 1 µm (this step may hereinafter be referred to as step (A)); and then covering the resultant particles with a metal oxide (this step may hereinafter be referred to as step (B)).

Examples of the aforementioned step (A) include: a step of, in the aforementioned case where the particles as obtained by the process including the step of polish-pulverizing the coarse particles of the compound semiconductor to thereby fine the particles are used as raw materials in the first production process according to the present invention, carrying out such a process for producing the particles as used as raw materials in the first production process according to the present invention; or a step of carrying out a process for obtaining the body particles of the compound semiconductor particles according to the present invention.

There is no especial limitation on the aforementioned step (B), if it is a step of covering the particles (resultant from the step (A)) with the metal oxide. For example, any step is applicable if it is a hitherto publicly known step of carrying out a process for covering the particles with the metal oxide. However, the step (B) is favorably the step of carrying out the covering method as explained about the first production process according to the present invention.

In the second production process for compound semiconductor particles according to the present invention, between the steps (A) and (B) both exclusive, the particles may be heat-treated at a temperature of not lower than 50° C. (favorably not lower than the boiling point of the solvent), favorably under pressure. Also, after the aforementioned step (B), the particles may be heat-treated at a temperature of not lower than 50° C. (favorably not lower than the boiling point of the solvent), favorably under pressure. If the particles is heat-treated in these ways, then there is, for example, a case where the properties, particularly the luminescence property, of the resulting compound semiconductor particles are enhanced.

The present inventors have further found out that the compound semiconductor particles according to the present invention or the compound semiconductor particles as obtained by the first or second production process according to the present invention are very useful as fluophors. Prior fluophors were designed, for such as cathode-ray tubes, fluorescent lamps, and plasma display devices, so that the excitation efficiency would be high in the electron beam range (cathode-ray tubes) and/or in the short wavelength range shorter than 300 nm (fluorescent lamps, plasma display devices). The compound semiconductor particles according to the present invention or the compound semiconductor particles as obtained by the first or second production process according to the present invention are, unlike prior ones, extremely useful in point of being usable as fluophors of which the excitation efficiency is high as to long-wavelength ultraviolet rays and/or short-wavelength visible rays (violet to blue), particularly as to light having a wavelength around 400 nm, specifically, favorably in the range of 350 to 450 nm, more favorably 380 to 420 nm.

Examples of uses of the fluophors of which the excitation efficiency is high as to the light having a wavelength around 400 nm include: white LED; general illumination (substitutes for fluorescent lamps); illumination light sources of LCD (liquid crystal displays); light-emitting diode multicolor displays; tumor markers; and wavelength-converting materials for interior and exterior decoration films and for plant-raising films.

DETAILED DESCRIPTION OF THE PREFERRED EMBODIMENTS

Hereinafter, the present invention is more specifically illustrated by the following examples of some preferred embodiments in comparison with comparative examples not according to the present invention. However, the present invention is not limited to these examples in any way. Incidentally, for convenience, the units "part(s) by weight", "liter(s)" and "weight %" may hereinafter be abbreviated simply to "part(s)", "L", and "wt %" respectively.

<Preparation of Powder Sample>:

A portion of a dispersion of compound semiconductor particles or a portion of a dispersion of covered compound semiconductor particles was centrifuged, and the resultant precipitate was washed with acetone and thereafter dried under vacuum at 50° C., thus obtaining the powder sample.

<Average Particle Diameter of Compound Semiconductor Particles as Raw Materials>:

This was determined by measuring the particle diameters of 30 particles with a scanning electron microscope and number-averaging the measured particle diameters.

<Composition (Dopant Concentration and Mixed-crystal Composition) and Crystal Structure of Compound Semiconductor Particles>:

These were determined by fluorescent X-ray analysis or X-ray powder diffractometry as to the powder sample and the raw materials.

<Dispersed-particle Diameter of Polish-pulverized Compound Semiconductor Particles in its Dispersion>:

This was evaluated with a dynamic light-scattering type particle diameter distribution measurement apparatus (produced by Horiba, Ltd.). In the case where a dilution with a solvent was used as the sample in the measurement, the same solvent as that in the dispersion was used.

<TEM Particle Diameter of Polish-pulverized Compound Semiconductor Particles in its Dispersion>:

This was determined by number-averaging the particle diameters of 30 primary particles from their transmission-electron-microscopic image.

<Crystal Grain Diameter of Polish-pulverized Compound Semiconductor Particles in its Dispersion>:

An X-ray powder diffraction pattern of the powder sample was obtained with an X-ray powder diffraction apparatus (RINT 2400, produced by Rigaku), and then there was measured the full width of the half maximum intensity of a diffraction ray having the highest diffraction intensity (the most intense ray), and then the crystal grain diameter was calculated from the measured value in accordance with Scherrer equation. In that case, the K value (Scherrer constant) was assumed to be 1.

<Dispersed-particle Diameter of Covered Compound Semiconductor Particles>:

This was evaluated with a dynamic light-scattering type particle diameter distribution measurement apparatus (produced by Horiba, Ltd.). In the case where a dilution with a solvent was used as the sample in the measurement, the same solvent as that in the dispersion was used.

<TEM Particle Diameter of Covered Compound Semiconductor Particles>:

This was determined by number-averaging the particle diameters of 30 primary particles from their transmission-electron-microscopic image.

<Form of Covered Compound Semiconductor Particles and Form of Covering Layer>:

They were judged by observation with a transmission electron microscope.

<Film Thickness of Covering Layer of Covered Compound Semiconductor Particles>:

As to any 10 particles, the film thickness was read at 3 portions of each particle by observation with a transmission electron microscope. Then, the read film thicknesses at the total 30 portions were averaged to take the resultant average value as the film thickness of the covering layer.

<Composition of Covering Layer of Covered Compound Semiconductor Particles>:

This was judged from the result of the elemental analysis of the covering layer portion of the particles and the result of the fluorescent X-ray analysis of the powder sample, wherein the elemental analysis was carried out while the particles were observed with an FE-TEM (field emission type transmission electron microscope) as equipped with an XMA apparatus (X-ray microanalyzer) having the resolving power of 1 nm$\phi$. In addition, the electron beam diffractometry of the covering layer portion and the X-ray diffractometry of the powder sample were also carried out to thereby confirm whether a crystalline covering layer was formed or not.

<Bonding Amount of Acyloxyl Group>:

The powder sample was added to a 0.5 N aqueous sodium hydroxide solution and the resultant mixture was stirred for 24 hours. Thereafter the insoluble components were removed by centrifugal separation, and the resultant solution was analyzed by ion chromatography, thus determining the bonding amount. To make assurance double sure, the pyrolysis property of the powder sample was examined by TG-DTA to thereby confirm the bonding.

<Photoluminescence Property>:

About 50 mg of the powder sample was packed into a measuring portion as formed by boring a hole through a copper plate. Then, the copper plate was fixed to a sample stand of a cryostat and then kept at 10 K under vacuum, and an He—Cd laser (325 nm, excitation intensity: 625 mw/cm$^2$) was used as the excitation source. A high-functional multi-detection system (Multiviewer Macs 320, produced by Jobin Yvon; using the HR-320 optical system) was used for the spectroscopy, the detection, and the measurement.

The luminescence colors were judged from the emission spectrum property.

<Fluorescence Property Due to Light Source of Ultraviolet-light-emitting Diode>:

The same apparatus as used for the measurement of the photoluminescence property was used for the spectroscopy, the detection, and the measurement. An ultraviolet-light-emitting diode (peak wavelength: 400 nm) was used as the excitation source.

An amount of 1.5 ml of a dilution of a reaction liquid or dispersion as obtained in each Example was placed as the measurement sample into a measurement portion including a vial of 1.6 ml in capacity, and then the measurement was carried out.

Measurement sample: particle concentration=0.5 µg/ml

Diluting solvent: methanol

Measurement conditions: exposing time=2 sec, number of times of delay=5, and number of times of integration=30

Sample temperature during measurement: 25° C. (the sample was adjusted to 25° C. in an isothermal bath of 25° C. in advance of the measurement and thereafter introduced into the measurement portion and immediately thereafter measured.)

The luminescence colors were judged from the emission spectrum property.

EXAMPLE 1

A stainless-steel (SUS316)-made pot of 120 mL in capacity was charged with 270 parts of stainless-steel (SUS316)-made balls having a diameter of 3.18 mmϕ (as balls for polish-pulverization), 13 parts of CdSe (as the compound semiconductor), and 4 parts of heptane (as the solvent), and then the pot was tightly shut. Incidentally, the pot as used was the shape of a column having a sectional diameter of 50 mm, and its bottom had a curved semispherical face having a radius of curvature of 25 mm and being convex outward of the pot.

This pot was set to a ball mill apparatus to make revolution at a set revolution rate of the pot of 298 rpm and a set revolution rate of the disk of 139 rpm for 80 hours, thus carrying out the polish-pulverization (hereinafter referred to as polish-pulverization treatment).

After the polish-pulverization treatment, there was obtained a dispersion (1a) of compound semiconductor particles by filtrating the contents as obtained in the pot. As a result of observation of the dispersion (1a) with a TEM, it was confirmed that CdSe particles having an average particle diameter of 0.03 μm were formed in the dispersion (1a) wherein a portion of the CdSe particles were fine CdSe particles having particle diameters of about 19 nm (as shown in FIG. 1).

Incidentally, the above particle diameters and average particle diameter were measured by observation with a transmission electron microscope. The average particle diameter was determined by measuring the particle diameters of any 30 particles and calculating their number-average particle diameter. These are the same also in such as the following examples.

EXAMPLE 2

The same pot as used in Example 1 was charged with 65 parts of stainless-steel (SUS316)-made balls having a diameter of 5 mmϕ (as balls for polish-pulverization), 5 parts of CdSe (as the compound semiconductor), and 3 parts of methanol (as the solvent), and then the pot was tightly shut.

This pot was set to a ball mill apparatus to make revolution at a set revolution rate of the pot of 229 rpm and a set revolution rate of the disk of 107 rpm for 40 hours, thus carrying out the polish-pulverization treatment.

After the above treatment (revolution for 40 hours), there were taken out the stainless-steel (SUS316)-made balls for the polish-pulverization having a diameter of 5 mmϕ, and then instead thereof stainless-steel (SUS316)-made balls for polish-pulverization having a diameter of 3 mmϕ were charged into the pot. Then, the revolution was made for 52 hours under the same revolution rate conditions as of the preceding treatment, thus carrying out the polish-pulverization treatment.

Furthermore, after the above treatment (revolution for 52 hours), there were taken out the stainless-steel (SUS316)-made balls for the polish-pulverization having a diameter of 3 mmϕ, and then instead thereof stainless-steel (SUS316)-made balls for polish-pulverization having a diameter of 1 mmϕ were charged into the pot. Then, the revolution was made for 87 hours under the same revolution rate conditions as of the preceding treatment, thus carrying out the polish-pulverization treatment.

Figure 2:
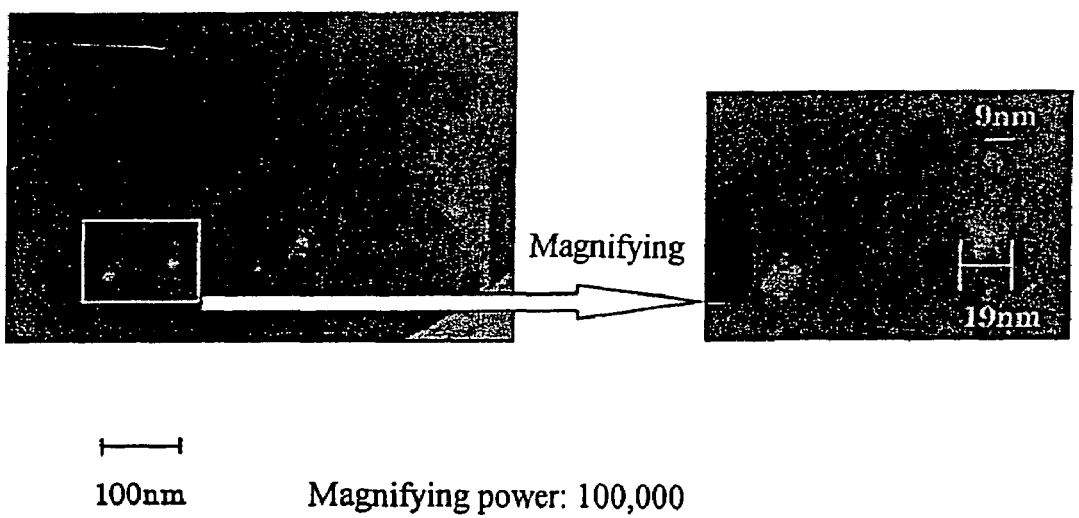
FIG. 2 is an electron micrograph showing a TEM image of the fine CdSe particles having particle diameters of about 19 nm or not larger than 10 nm as obtained in Example 2.

After all the polish-pulverization treatments, there was obtained a dispersion (2a) of compound semiconductor particles by filtrating the contents as obtained in the pot. As a result of observation of the dispersion (2a) with a TEM, it was confirmed that CdSe particles (compound semiconductor particles) having an average particle diameter of 0.03 μm were formed in the dispersion (2a) wherein a portion of the CdSe particles were fine CdSe particles having particle diameters of about 19 nm and fine CdSe particles having particle diameters of not larger than 10 nm (as shown in FIG. 2).

EXAMPLE 3

There was obtained a dispersion (3a) of compound semiconductor particles in the same way as of Example 2 except to replace the 5 parts of CdSe with 5 parts of ZnS. As a result of observation of the dispersion (3a) with a TEM, it was confirmed that fine ZnS particles (compound semiconductor particles) having an average particle diameter of 0.03 μm were formed in the dispersion (3a) wherein a portion of the ZnS particles were fine ZnS particles having particle diameters of not larger than 10 nm.

EXAMPLE 4

There was prepared a reaction apparatus having a stainless-steel (SUS316)-made reactor of 1 L. Incidentally, this stainless-steel-made reactor is a reactor having the pressure resistance to 10 MPa, wherein the reactor is equipped with an addition tank having a stirrer, an addition inlet as directly connected to the addition tank, and a thermometer, and can be heated from the outside.

The reactor was charged with 16 parts of the dispersion (2a) as obtained in Example 2, 18 parts of zinc acetate, and 800 parts of methanol. The resultant mixture was heated to 150° C. under stirred conditions. Thereafter, the mixture was maintained at 150° C. for 1 hour and thereafter cooled, thus obtaining a reaction liquid (4b).

While fine particles as contained in the resultant reaction liquid (4b) were observed with an FE-TEM (field emission type transmission electron microscope) as equipped with an XMA apparatus (X-ray microanalyzer) having the resolving power of 1 nmϕ, the elemental analysis of the above fine particles was carried out. As a result, it was confirmed that the fine particles were fine CdSe particles covered with zinc oxide (ZnO). Furthermore, the fine particles as obtained were subjected to such as the ion chromatographic analysis, the TG-DTA analysis, and the temperature-raising elimination analysis using a heating furnace as directly connected to a GC-MS. As a result, it was confirmed that the ZnO, as provided to the covering, contained the acetoxy group in a bonded state in an amount of 1 weight % relative to the ZnO (1.38 mol % relative to Zn).

EXAMPLE 5

There was prepared the same reaction apparatus as used in Example 4.

The reactor was charged with 16 parts of the dispersion (3a) as obtained in Example 3 and 700 parts of n-butanol. The resultant mixture was heated to 180° C. under stirred conditions.

In addition, the addition tank was charged with 100 parts of a indium acetate dispersion as obtained by dispersing 44 parts of indium acetate into n-butanol. The time of addition of this indium acetate dispersion was divided into 10 times, and the indium acetate dispersion was added in an amount of 10 parts each at intervals of 20 minutes. After this addition, the resultant mixture was maintained at 180° C. for 1 hour and thereafter cooled, thus obtaining a reaction liquid (5b).

While fine particles as contained in the resultant reaction liquid (5b) were observed with the same FE-TEM (field emission type transmission electron microscope) as used in Example 4, the elemental analysis of the above fine particles was carried out. As a result, it was confirmed that the fine particles were fine ZnS particles covered with indium oxide ($In_2O_3$). Furthermore, the fine particles as obtained were subjected to such as the ion chromatographic analysis, the TG-DTA analysis, and the temperature-raising elimination analysis using a heating furnace as directly connected to a GC-MS. As a result, it was confirmed that the $In_2O_3$, as provided to the covering, contained the acetoxy group in a bonded state in an amount of 5 weight % relative to the $In_2O_3$ (11.8 mol % relative to In).

EXAMPLE 6

The same pot as used in Example 1 was charged with 65 parts of stainless-steel (SUS316)-made balls having a diameter of 5 mmφ (as balls for polish-pulverization), 5 parts of CdSe (as the compound semiconductor (coarse particles of a compound semiconductor)), and 10 parts of hexane (as the solvent), and then the pot was tightly shut.

This pot was set to a ball mill apparatus to make revolution at a set revolution rate of the pot of 229 rpm and a set revolution rate of the disk of 107 rpm for 1 hour, thus carrying out the polish-pulverization treatment.

After the polish-pulverization treatment, 0.16 part of acetic acid (acetic acid/Cd=0.1 (molar ratio)) was added to the contents as obtained in the pot, and the resultant mixture was stirred for 1 hour, and thereafter the mixture was filtrated, thus obtaining a dispersion (6a) of compound semiconductor particles.

While fine particles as contained in the resultant dispersion (6a) were observed with the FE-TEM as equipped with the XMA apparatus having the resolving power of 1 nmφ in the same way as of Example 4, the elemental analysis of the above fine particles was carried out. As a result, it was confirmed that: in the dispersion (6a), there were dispersed CdSe particles (compound semiconductor particles) having particle diameters of 0.2 to 1.0 μm in an amount of 10 wt %, and further there existed fine particles as impurities different from the CdSe though being a trace.

Accordingly, the centrifugal separation treatment of the dispersion (6a) was carried out to thereby sediment the fine CdSe particles. After the supernatant had been separated, the sediment was washed with hexane and then re-dispersed into 2-butoxyethanol. The polish-pulverization treatment was carried out again for 10 hours, and then the contents as obtained in the pot were filtrated, thus obtaining a dispersion (6a') of compound semiconductor particles.

While fine particles as contained in the dispersion (6a') were observed with the FE-TEM as equipped with the XMA apparatus having the resolving power of 1 nmφ in the same way as of Example 4, the elemental analysis of the above fine particles was carried out. As a result, it was confirmed that, in the dispersion (6a'), there were dispersed fine CdSe particles (compound semiconductor particles) having particle diameters of 50 to 300 nm in an amount of 10 wt %.

On the other hand, the above separated supernatant was concentrated with an evaporator. While fine particles as contained in the resultant concentrate were observed with the FE-TEM as equipped with the XMA apparatus having the resolving power of 1 nmφ in the same way as of Example 4, the elemental analysis of the above fine particles was carried out. As a result, it was confirmed that there existed fine Cu particles, fine CuSe particles, and fine Se particles having particle diameters of 5 to 20 nm.

There was carried out the ICP analysis of the Cu content of the compound semiconductor CdSe (coarse particles of the compound semiconductor) used as raw materials. As a result, the above content was 0.5 ppm, but the Cu content of the dispersion (6a') was less than 0.1 ppm relative to the CdSe.

COMPARATIVE EXAMPLE 1

For comparison, there was obtained a 2-butoxyethanol dispersion (C1a) by carrying out the same procedure as of Example 6, except to add no acetic acid. As a result, neither fine Cu particles nor fine CuSe particles were detected in the supernatant resultant from the centrifugal separation treatment, and the Cu content of the dispersion (C1a) was 0.5 ppm relative to the CdSe.

EXAMPLE 7

A mixture, as obtained by adding and mixing 10 parts of zinc acetate into 100 parts of the dispersion (6a') as obtained in Example 6, was charged into the same reactor of the same reaction apparatus as used in Example 4, and this mixture was stirred and heated from ordinary temperature (25° C.) to 120° C. While being maintained at 120±2° C., the mixture was heat-treated for 30 minutes and then cooled, thus obtaining a reaction liquid (7b).

While fine particles as contained in the reaction liquid (7b) were observed with the FE-TEM as equipped with the XMA apparatus having the resolving power of 1 nmφ in the same way as of Example 4, the elemental analysis of the above fine particles was carried out. As a result, it was confirmed that, in the reaction liquid (7b), there were dispersed fine CdSe particles which had particle diameters of about 50 to about 350 nm and were covered with ZnO.

Figure 3:
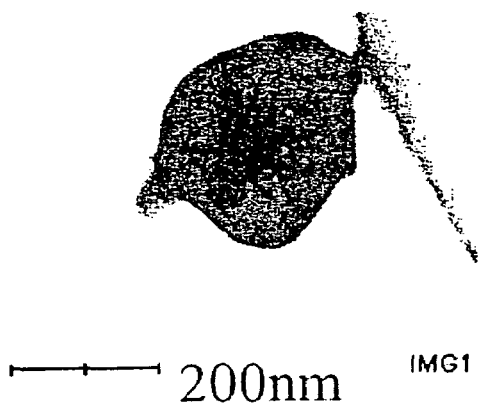
FIG. 3 is an electron micrograph showing a TEM image of the fine CdSe particles as obtained in Example 7.
Figure 4:
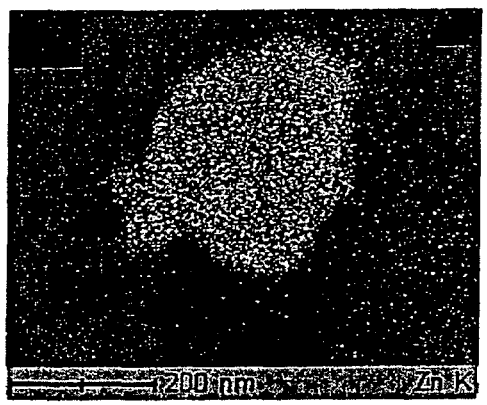
FIG. 4 shows results of the elemental analysis of the fine CdSe particles, as obtained in Example 7, by the energy-dispersive X-ray analysis method. FIG. (a) shows a mapping as to the Zn element, and FIG. (b) shows a mapping as to the Zn element and the Cd element.
Figure 4:
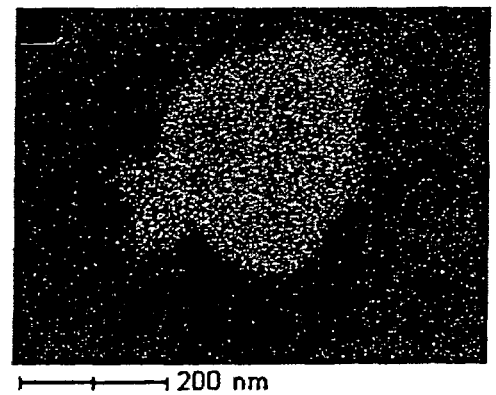

A TEM image of the analyzed fine CdSe particles is shown in FIG. 3, and an example of the results of the elemental analysis of the fine CdSe particles by the energy-dispersive X-ray analysis method is shown in FIG. 4. From FIGS. 3 and 4, it can be understood that the fine CdSe particles having particle diameters of about 240 nm are covered with a ZnO layer having a thickness of about 20 to about 30 nm.

EXAMPLES 8 TO 11

In accordance with the charging composition as listed in Table 2, the same pot as used in Example 1 was charged with the raw materials as listed in Table 1, the below-mentioned media for polish-pulverization, the solvents as listed in Table 2, and the additives as listed in Table 2. Then, the pot was tightly shut and then set to a ball mill apparatus to carry out the polish-pulverization treatment under the following conditions.

First, a mixture of stainless-steel (SUS316)-made balls having a diameter of 1 mmφ and Y-containing zirconia beads ($ZrO_2(Y)$) having a diameter of 0.1 mmφ (weight ratio=1:1) was used as the media for polish-pulverization to carry out the polish-pulverization treatment by making revolution at a set revolution rate of the pot of 1,000 rpm and a set revolution rate of the disk of 139 rpm for 1 hour.

After the above treatment (revolution for 1 hour), there were taken out the mixture of the stainless-steel (SUS316)-made balls having a diameter of 1 mmφ and the Y-containing zirconia beads ($ZrO_2(Y)$) having a diameter of 0.1 mmφ, and then instead thereof Y-containing zirconia beads (ZrO$_2$(Y)) having a diameter of 0.05 mm$\phi$ were charged into the pot. Then, the revolution was made at a set revolution rate of the pot of 100 rpm and a set revolution rate of the disk of 100 rpm for 10 hours, thus carrying out the polish-pulverization treatment.

Thereafter, while the same solvent as the used solvent was auxiliarily used to extract the particles from the pot together with the solvent, the contents of the pot were filtrated, thus obtaining a dispersion of compound semiconductor particles.

Furthermore, when the occasion demanded as listed in Table 2, a primary-particle formation promoter was added to carry out the monodispersing treatment, and then the resultant mixture was filtrated, thus obtaining dispersions (8a) to (11a) of the compound semiconductor particles as listed in Table 3.

Next, as to the resultant dispersions (8a) to (11a) of the compound semiconductor particles, the particles were covered under conditions as listed in Table 4, thus obtaining dispersions (8b) to (11b) of the covered compound semiconductor particles. The results of the analysis of the resultant particles are listed in Table 5.

Hereupon, in Example 8, the dispersion to be subjected to the covering was used after being diluted with the same solvent as that in the dispersion into the concentration as listed in Table 4.

Incidentally, the reaction methods A, B, and C for the covering as listed in Table 4 are as follows.

Reaction method A: The same pressure-resistant reactor as used in Example 4 was charged with the dispersion of the compound semiconductor particles and a liquid (solution or slurry) including a raw material for the covering, and the resultant mixture was heated under stirred conditions and then maintained at the temperature as listed in Table 4.

Reaction method B: The same pressure-resistant reactor as used in Example 4 was charged with the dispersion of the compound semiconductor particles. On the other hand, the addition tank was charged with a liquid (solution or slurry) including a raw material for the covering. The dispersion of the compound semiconductor particles was heated under stirred conditions and then maintained at the temperature as listed in Table 4. Thereafter, the liquid (solution or slurry) including the raw material for the covering was added (divisionally added or continuously fed) from the addition tank, and the resultant mixture was maintained at the above temperature for the time as listed in Table 4.

Reaction method C: A mixture, as obtained by mixing the dispersion of the compound semiconductor particles and a liquid (solution or slurry) including a raw material for the covering with a mixer, was passed through a SUS-made tube reactor (inner diameter: 20 mm$\phi$) as immersed in a heat medium, thus carrying out a reaction at the temperature (which was the set temperature of the tube reactor) for the time as listed in Table 4.

EXAMPLES 12 TO 14

In accordance with the charging composition as listed in Table 2, the same pot as used in Example 1 was charged with the raw materials as listed in Table 1, the below-mentioned media for polish-pulverization, the solvents as listed in Table 2, and the additives as listed in Table 2. Then, the pot was tightly shut and then set to a ball mill apparatus to carry out the polish-pulverization treatment under the following conditions.

A mixture of stainless-steel (SUS316)-made balls having a diameter of 5 mm$\phi$, stainless-steel (SUS316)-made balls having a diameter of 3 mm$\phi$, stainless-steel (SUS316)-made balls having a diameter of 1 mm$\phi$, and Y-containing zirconia beads (ZrO$_2$(Y)) having a diameter of 0.05 mm$\phi$ (weight ratio=1:1:1:2) was used as the media for polish-pulverization to carry out the polish-pulverization treatment by making revolution at a set revolution rate of the pot of 1,000 rpm and a set revolution rate of the disk of 139 rpm for 10 hours.

Thereafter, while the same solvent as the used solvent was auxiliarily used to extract the particles from the pot together with the solvent, the contents of the pot were filtrated, thus obtaining a dispersion of compound semiconductor particles.

Furthermore, when the occasion demanded as listed in Table 2, a primary-particle formation promoter was added to carry out the monodispersing treatment, and then the resultant mixture was filtrated, thus obtaining dispersions (12a) to (14a) of the compound semiconductor particles as listed in Table 3.

Next, as to the resultant dispersions (12a) to (14a) of the compound semiconductor particles, the particles were covered under conditions as listed in Table 4, thus obtaining dispersions (12b) to (14b) of the covered compound semiconductor particles. The results of the analysis of the resultant particles are listed in Table 5.

Hereupon, in Example 12, the dispersion to be subjected to the covering was used after being diluted with the same solvent as that in the dispersion into the concentration as listed in Table 4.

Incidentally, the reaction methods A, B, and C for the covering as listed in Table 4 are as aforementioned.

EXAMPLES 15 TO 18

In accordance with the charging composition as listed in Table 2, the same pot as used in Example 1 was charged with the raw materials as listed in Table 1, the below-mentioned media for polish-pulverization, the solvents as listed in Table 2, and the additives as listed in Table 2. Then, the pot was tightly shut and then set to a ball mill apparatus to carry out the polish-pulverization treatment under the following conditions.

First, stainless-steel (SUS316)-made balls having a diameter of 1 mm$\phi$ were used as the media for polish-pulverization to carry out the polish-pulverization treatment by making revolution at a set revolution rate of the pot of 1,000 rpm and a set revolution rate of the disk of 1,000 rpm for 3 hours.

After the above treatment (revolution for 3 hours), there were taken out the stainless-steel (SUS316)-made balls having a diameter of 1 mm$\phi$, and then instead thereof Y-containing zirconia beads (ZrO$_2$(Y)) having a diameter of 0.1 mm$\phi$ were charged into the pot. Then, the revolution was made at a set revolution rate of the pot of 800 rpm and a set revolution rate of the disk of 139 rpm for 1 hour, thus carrying out the polish-pulverization treatment.

After the above treatment (revolution for 1 hour), there were taken out the Y-containing zirconia beads (ZrO$_2$(Y)) having a diameter of 0.1 mm$\phi$, and then instead thereof Y-containing zirconia beads (ZrO$_2$(Y)) having a diameter of 0.05 mm$\phi$ were charged into the pot. Then, the revolution was made at a set revolution rate of the pot of 400 rpm and a set revolution rate of the disk of 139 rpm for 1 hour, thus carrying out the polish-pulverization treatment.

Thereafter, while the same solvent as the used solvent was auxiliarily used to extract the particles from the pot together with the solvent, the contents of the pot were filtrated, thus obtaining a dispersion of compound semiconductor particles.

Furthermore, when the occasion demanded as listed in Table 2, a primary-particle formation promoter was added to carry out the monodispersing treatment, and then the resultant mixture was filtrated, thus obtaining dispersions (15a) to (18a) of the compound semiconductor particles as listed in Table 3.

Next, as to the resultant dispersions (15a) to (18a) of the compound semiconductor particles, the particles were covered under conditions as listed in Table 4, thus obtaining dispersions (15b) to (18b) of the covered compound semiconductor particles. The results of the analysis of the resultant particles are listed in Table 5.

Hereupon, in Example 18, the dispersion to be subjected to the covering was used after being concentrated into the concentration as listed in Table 4 by removing a portion of the solvent by heating under reduced pressure with an evaporator.

Incidentally, the reaction methods A, B, and C for the covering as listed in Table 4 are as aforementioned.

EXAMPLES 19 TO 22

The dispersions (8a) to (10a) and (12a) to be subjected to the covering in Examples 8 to 10 and 12 were heat-treated under conditions as listed in Table 6 before the covering, and thereafter the covering was carried out under the same conditions as of Examples 8, 9, 10, and 12, thus obtaining dispersions (19b) to (22b) of the covered compound semiconductor particles.

EXAMPLE 23

The dispersion (8b) of the covered compound semiconductor particles, as obtained in Example 8, was heat-treated at 200° C. for 1 hour, thus obtaining a dispersion (23b) of the covered compound semiconductor particles.

EXAMPLE 24

The dispersion (12b) of the covered compound semiconductor particles, as obtained in Example 12, was heat-treated at 250° C. for 1 hour, thus obtaining a dispersion (24b) of the covered compound semiconductor particles.

EXAMPLE 25

A CaS:Ce (Ce/Ca=0.2 atm %) polycrystal (average particle diameter: 1 μm) was preliminarily polish-pulverized by using the same apparatus as used in Example 1, thus preparing a slurry including a methanol solvent and CaS:Ce particles (TEM particle diameter: 8 nm, dispersed-particle diameter: 200 nm) that were dispersed and contained in the methanol solvent in an amount of 5 wt %. Next, the same apparatus as used in Example 1 was charged with a mixture including 20 parts of the above slurry, 10 parts of zinc acetate (as the raw metal material for the covering metal oxide), and 0.01 part of acetic acid and with 10 parts of zirconia beads ($ZrO_2$: Y) having a diameter of 0.05 μmφ (as the media). Then, the polish-pulverization treatment was carried out for 100 hours under conditions of revolution rate of the pot=500 rpm and revolution rate of the disk=50 rpm. The resultant contents were filtrated, thus obtaining a dispersion (25b) including methanol and particles (particle concentration: 5 wt %, dispersed-particle diameter: 20 nm, TEM particle diameter: 12 nm) that were dispersed in the methanol.

As a result of the analysis of the particles in the dispersion (25b) as obtained, it was found that the CaS:Ce having a crystal grain diameter of 5 nm was covered with a ZnO layer having a thickness of 2 to 3 nm.

EXAMPLE 26

The reaction liquid (4b), as obtained in Example 4, and the dispersions (8b) to (10b), (12b), and (19b) to (24b) as obtained in Examples 8 to 10, 12, and 19 to 24, were evaluated by the photoluminescence property. The evaluation results are listed in Table 7.

It was found that the particles as contained in any dispersion emit light in the luminescence colors as listed in Table 7.

EXAMPLE 27

The reaction liquid (4b), as obtained in Example 4, and the dispersions (8b) to (10b), (12b), and (19b) to (24b) as obtained in Examples 8 to 10, 12, and 19 to 24, were evaluated by the fluorescence property due to the light source of the ultraviolet-light-emitting diode. The evaluation results are listed in Table 8.

As is shown in Table 8, it was found that the particles as contained in any dispersion emit light in the same luminescence colors as listed in Table 7.

In addition, it was found that the fluorescence of the particles, as contained in the dispersions (19b) to (24b) as obtained in Examples 19 to 24 in which the heat treatment was carried out, is more intense than that of the particles as contained in the dispersions as obtained in their respective corresponding Examples (Examples 8, 9, 10, 12, 8, and 12 in order) in which the heat treatment was not carried out.

COMPARATIVE EXAMPLE 2

There was prepared 100 parts of an ethanol dispersion including ZnS—Mn particles (Mn/Zn=0.3 atm %, particle diameter as found with TEM=3 to 5 nm) in an amount of 1 wt %, wherein the ethanol dispersion was obtained by a liquid phase method (including the steps of: adding a methanol solution of zinc acetate and manganese acetate to an aqueous sodium sulfide solution; and then collecting the resultant precipitate by centrifugal separation; and then washing the precipitate with methanol; and then dispersing the precipitate into ethanol).

While this dispersion was stirred, 2 parts of ammonia water ($NH_3$ content: 1%) was added thereto as the catalyst for hydrolysis, and thereafter 10 parts of an ethanol solution containing tetramethoxysilane in an amount of 10 wt % was further added.

The dispersion as obtained this way was a liquid having a high tendency to involve sedimentation. The particles in this liquid were particles which had formed an aggregate by aggregation of silica and ZnS—Mn particles in large numbers, so it was difficult to say that the ZnS—Mn particles were covered with the silica.

COMPARATIVE EXAMPLE 3

The same procedure as of Comparative Example 2 was carried out except to replace the catalyst for hydrolysis with 2 parts of an aqueous solution containing acetic acid in an amount of 1 wt %.

The resultant dispersion was a liquid having a high tendency to involve sedimentation. The particles in this liquid were particles which had formed an aggregate by aggregation of silica and ZnS—Mn particles in large numbers, so it was difficult to say that the ZnS—Mn particles were covered with the silica.

TABLE 1

| Example | Classification of compound | Raw material | Dopant/M (atm %) | Composition of mixed crystal | Crystal structure of raw material | Average particle diameter |
|---|---|---|---|---|---|---|
| 8 | II-VI | ZnS:Mn(II) | 0.03 | — | Polycrystal | 1.2 μm |
| 9 | II-VI | Y$_2$O$_3$:Eu(III) | 0.1 | — | Polycrystal | 3.2 μm |
| 10 | IIa-VI | SrS:Tb(III) | 0.5 | — | Polycrystal | 50 μm |
| 11 | IIa-VI | CaS:Sm(III) | 1 | — | Polycrystal | 50 μm |
| 12 | II-VI | ZnS:Cu(II) | 1.5 | — | Polycrystal | 12 μm |
| 13 | II-VI mixed crystal | ZnSSe:Mn(II) | 0.8 | S/Se = 8/2 | Polycrystal | 5.3 μm |
| 14 | II-VI mixed crystal | ZnMgS | 0 | Zn/Mg = 9/1 | Polycrystal | 11 μm |
| 15 | III-V mixed crystal | AlInP | 0 | Al/In = 7/3 | Polycrystal | 14 μm |
| 16 | IV—IV | SiC | 0 | — | Polycrystal | 1.5 μm |
| 17 | IV-VI | PbTe | 0 | — | Polycrystal | 3.3 μm |
| 18 | II-VI | CaSrS:Ce | 1.1 | Ca/Sr = 1/1 | Polycrystal | 1 mm |

M: This denotes being based on the metal in the raw material

TABLE 2

| | Charging composition | | | | | | Monodispersing treatment conditions | | |
|---|---|---|---|---|---|---|---|---|---|
| Example | Raw material (parts) | Solvent (parts) | Media (parts) | Composition of solvent | Additive (primary-particle formation promoter) | Amount of additive (mol %/M) | Monodispersing treatment apparatus | Additive (primary-particle formation promoter) | Amount of additive (mol %/M) |
| 8 | 5 | 3 | 65 | Methanol | None | — | Beads mill | Acetic acid | 1 |
| 9 | 5 | 3 | 65 | Ethanol | None | — | Homogenizer | None | — |
| 10 | 5 | 3 | 65 | Benzyl alcohol | 2-Ethylhexanoic acid | 1 | Homogenizer | None | — |
| 11 | 5 | 3 | 65 | EGDME | Acetic acid | 1 | None | None | — |
| 12 | 5 | 3 | 65 | Methanol | None | — | Homomixer | Acetic acid | 0.1 |
| 13 | 5 | 3 | 65 | Methanol | None | — | Stirring | Acetic acid | 0.01 |
| 14 | 5 | 3 | 65 | IPA | None | — | Beads mill | Propionic acid | 10 |
| 15 | 5 | 3 | 65 | Ethanol | Propionic acid | 10 | None | None | — |
| 16 | 5 | 3 | 65 | PGMAc | None | — | None | None | — |
| 17 | 5 | 3 | 65 | Butyl acetate | Lauric acid | 0.1 | Paint shaker | None | — |
| 18 | 5 | 3 | 65 | Methanol | Acetic acid | 1 | None | None | — |

EGDME: Ethylene glycol dimethyl ether
PGMAc: Propylene glycol methyl ether acetate
M in unit of amount of additive: This denotes being based on the metal in the raw material
Beads mill: Y-containing zirconia beads having a diameter of 50 μmϕ were used as the media.

TABLE 3

| Example | Dispersion of compound semiconductor particles | Particle concentration (wt %) | Solvent | Dispersed-particle diameter (nm) | TEM particle diameter (nm) | Crystal grain diameter (nm) |
|---|---|---|---|---|---|---|
| 8 | (8a) | 12 | Methanol | 8 | 4 | 3 |
| 9 | (9a) | 3 | Ethanol | 23 | 10 | 8 |
| 10 | (10a) | 6 | Benzyl alcohol | 60 | 20 | 18 |
| 11 | (11a) | 10 | EGDME | 18 | 12 | 12 |
| 12 | (12a) | 10 | Methanol | 30 | 20 | 18 |
| 13 | (13a) | 8 | Methanol | 24 | 13 | 13 |
| 14 | (14a) | 0.5 | IPA | 10 | 5 | 4 |
| 15 | (15a) | 10 | Ethanol | 12 | 9 | 7 |
| 16 | (16a) | 1 | PGMAc | 73 | 11 | 10 |
| 17 | (17a) | 15 | Butyl acetate | 20 | 8 | 7 |
| 18 | (18a) | 18 | Methanol | 16 | 7 | 5 |

EGDME: Ethylene glycol dimethyl ether
PGMAc: Propylene glycol methyl ether acetate

TABLE 4

| Example | Reaction method | Covering reaction conditions - Addition method in case of method B | Heating temperature × heating time | Dispersion to be covered - Amount of dispersion (parts) | Amount of particles (parts) | Raw metal material - Kind | Parts | Solvent - Kind | Parts | Carboxyl-group-containing compound - Kind | Parts |
|---|---|---|---|---|---|---|---|---|---|---|---|
| 8 | A | — | 120° C. × 1 hour | 100 | 5 | Zinc propionate | 26 | Methanol | 0 | — | — |
| 9 | B | 10 divisional additions at intervals of 10 minutes | Addition of raw covering material at 150° C. and thereafter heating for 1 hour | 100 | 3 | Tin (IV) acetate | 28 | Ethanol | 30 | — | — |
| 10 | C | — | 200° C. × 10 minutes | 100 | 6 | Zirconium 2-ethyl-hexanoate | 16 | Benzyl alcohol | 100 | — | — |
| 11 | C | — | 180° C. × 10 minutes | 100 | 10 | Hafnium n-butoxide | 170 | EGDME | 1000 | Acetic acid | 100 |
| 12 | C | — | 120° C. × 10 minutes | 100 | 1 | Zinc acetate / Indium acetate | 28 / 0.45 | Methanol | 200 | — | — |
| 13 | B | Feeding at a constant rate for 2 hours | Addition of raw covering material at 200° C. and thereafter heating for 1 hour | 100 | 8 | Bismuth (III) acetate oxide | 20 | Methanol | 40 | — | — |
| 14 | A | — | 200° C. × 1 hour | 100 | 0.5 | Yttrium acetate tetrahydrate | 4.5 | IPA | 0 | — | — |
| 15 | C | — | 200° C. × 10 minutes | 100 | 10 | Iron (III) acetate, basic | 643 | n-Butanol | 1000 | — | — |
| 16 | B | Feeding at a constant rate for 2 hours | Addition of raw covering material at 180° C. and thereafter heating for 1 hour | 100 | 1 | Titanium (IV) t-butoxide | 30 | PGMAc | 70 | Propionic acid | 10 |
| 17 | A | — | 200° C. × 10 minutes | 100 | 15 | Methyltri-methoxysilane | 0.6 | Butyl acetate | 0 | Formic acid | 3 |
| 18 | A | — | 200° C. × 1 hour | 100 | 30 | Lanthanum (III) acetate | 2.9 | Methanol | 0 | — | — |

EGDME: Ethylene glycol dimethyl ether,
PGMAc: Propylene glycol methyl ether acetate

TABLE 5

Results of analysis of dispersion of covered compound semiconductor particles

| Example | Dispersion | Dispersed-particle diameter (nm) | TEM particle diameter (nm) | Form | Form of covering layer | Film thickness of covering layer (nm) | Major component of covering layer | Acyloxyl group | Bonding amount of acyloxyl group (mol %/metal component of covering layer) |
|---|---|---|---|---|---|---|---|---|---|
| 8 | (8b) | 12 | 5.5 | Core-shell | Uniform film | 0.7 | (Zn—O)-major component | Propionyloxy | 12 |
| 9 | (9b) | 28 | 16 | Core-shell | Uniform film | 2.7 | Tin (IV) oxide | Acetoxy (Ethanoyloxy) | 5 |
| 10 | (10b) | 63 | 24 | Core-shell | Uniform film | 1.4 | Zirconium oxide | 2-Ethylhexanoyloxy | 1 |
| 11 | (11b) | 21 | 20 | Core-shell | Uniform film | 7 | Hafnium oxide | Acetoxy | 0.3 |
| 12 | (12b) | 35 | 32 | Core-shell | Uniform film | 11 | Zinc oxide crystal In/Zn = 1 atm % | Acetoxy | 0.5 |
| 13 | (13b) | 29 | 16 | Core-shell | Uniform film | 3 | Bismuth oxide | Acetoxy | 8 |
| 14 | (14b) | 11 | 6.3 | Core-shell | Uniform film | 1.2 | Yttrium oxide | Acetoxy | 12 |
| 15 | (15b) | 18 | 16 | Core-shell | Uniform film | 7 | Magnetite crystal | Acetoxy | 9 |
| 16 | (16b) | 90 | 16 | Core-shell | Uniform film | 5 | Titanium oxide (anatase) | Propionyloxy | 0.1 |

TABLE 5-continued

Results of analysis of dispersion of covered compound semiconductor particles

| Example | Dispersion | Dispersed-particle diameter (nm) | TEM particle diameter (nm) | Form | Form of covering layer | Film thickness of covering layer (nm) | Major component of covering layer | Acyloxyl group | Bonding amount of acyloxyl group (mol %/metal component of covering layer) |
|---|---|---|---|---|---|---|---|---|---|
| 17 | (17b) | 40 | 8 | Core-shell | Formation of almost single-molecular layer film | <0.2 | Polymethyl-siloxane-major component | None | — |
| 18 | (18b) | 14 | 7 | Core-shell | Attachment of fine particulate substance | <0.2 | (La—O)-major component | Acetoxy | 27 |

Hydrolyzed and condensed product from MTMS: Hydrolyzed and condensed product from methyltrimethoxysilane
Polymethylsiloxane: (—Si(CH$_3$)—O—)$_n$

TABLE 6

| | Heat-treatment conditions | | |
|---|---|---|---|
| Example | Dispersion to be heat-treated | Heating conditions | Pressure conditions |
| 19 | (8a) | Temperature was raised from ordinary temperature and then maintained at 100° C. for 1 hour. | Applied pressure |
| 20 | (9a) | Temperature was raised from ordinary temperature and then maintained at 150° C. for 1 hour. | Applied pressure |
| 21 | (10a) | Temperature was raised from ordinary temperature and then maintained at 250° C. for 10 minutes. | Applied pressure |
| 22 | (12a) | Temperature was raised from ordinary temperature and then maintained at 200° C. for 1 minute. | Applied pressure |

TABLE 7

| Reaction liquid or dispersion to be evaluated | Evaluation of photoluminescence property Luminescence color |
|---|---|
| Reaction liquid (4b) | Red |
| Dispersion (8b) | Yellow |
| Dispersion (9b) | Red |
| Dispersion (10b) | Green |
| Dispersion (12b) | Blue |
| Dispersion (19b) | Yellow |
| Dispersion (20b) | Red |
| Dispersion (21b) | Green |
| Dispersion (22b) | Blue |
| Dispersion (23b) | Yellow |
| Dispersion (24b) | Blue |

TABLE 8

| Reaction liquid or dispersion to be evaluated | Evaluation of fluorescence property due to light source of ultraviolet-light-emitting diode | |
|---|---|---|
| | Luminescence color | Luminosity |
| Reaction liquid (4b) | Red | — |
| Dispersion (8b) | Yellow | — |
| Dispersion (9b) | Red | — |
| Dispersion (10b) | Green | — |
| Dispersion (12b) | Blue | — |
| Dispersion (19b) | Yellow | More intense than dispersion (8a) |
| Dispersion (20b) | Red | More intense than dispersion (9a) |
| Dispersion (21b) | Green | More intense than dispersion (10a) |
| Dispersion (22b) | Blue | More intense than dispersion (12a) |
| Dispersion (23b) | Yellow | More intense than dispersion (8a) |
| Dispersion (24b) | Blue | More intense than dispersion (12a) |

INDUSTRIAL APPLICATION

The compound semiconductor particles according to the present invention, or the compound semiconductor particles as obtained by the production process according to the present invention, can be used, for example, as luminophors having a high-efficient luminescence property, specifically, as fluophor particles of various colors (e.g. red (R), green (G), blue (B), and yellow (Y)) and as luminophor particles being in the ultraviolet or infrared wavelength range. In addition, as to medical uses, the above particles can be used also for tumor markers, curing medicines, and examining agents for the purpose of detection of tumors (e.g. cancers) or examination of such as their progress conditions. Furthermore, the above particles can be used also for various sensors (e.g. biosensors; sensors for search of land mines, TNT (trinitrotoluene), and earth vein; and ultraviolet sensors) and wavelength-converting films.

The invention claimed is:

1. A production process for compound semiconductor particles, which comprises:
   a) the step of heating and/or polish-pulverizing i) a first mixture including a metal carboxylate, an alcohol, and particles or ii) a second mixture including a metal-alkoxy-group-containing compound, a carboxyl-group-containing compound, and particles,
   b) thereby covering the particles with a metal oxide,
   c) wherein the particles include a compound semiconductor.

2. A production process for compound semiconductor particles according to claim 1, wherein the particles including the compound semiconductor are particles as obtained by a process including the step of polish-pulverizing coarse particles of the compound semiconductor to thereby fine the particles.

3. A production process for compound semiconductor particles, which comprises the steps of: polish-pulverizing coarse particles of a compound semiconductor to thereby obtain particles having particle diameters of smaller than 1 µm; and then covering the resultant particles with a metal oxide.

4. Compound semiconductor particles, which comprise body particles and a metal oxide, wherein the body particles have particle diameters of smaller than 1 µm and are covered with the metal oxide and include a compound semiconductor including an essential element combination of at least one element X selected from the group consisting of C, Si, Ge, Sn, Pb, N, P, As, S, Sb, Se, and Te and at least one metal element M that is not identical with the element X, and wherein the metal oxide is a metal oxide to which an acyloxyl group is bonded.

5. Compound semiconductor particles according to claim 4, wherein the body particles are particles as obtained by a process including the step of polish-pulverizing coarse particles of the compound semiconductor including the essential element combination of at least one element X selected from the group consisting of C, Si, Ge, Sn, Pb, N, P, As, Sb, S, Se, and Te and at least one metal element M that is not identical with the element x.

* * * * *